United States Patent
Cotting et al.

(10) Patent No.: US 11,948,576 B2
(45) Date of Patent: Apr. 2, 2024

(54) PROACTIVE CACHING OF ASSISTANT ACTION CONTENT TO ENABLE RESOLUTION OF SPOKEN OR TYPED UTTERANCES

(71) Applicant: GOOGLE LLC, Mountain View, CA (US)

(72) Inventors: Daniel Cotting, Islisberg (CH); Zaheed Sabur, Baar (CH); Lan Huo, New York, NY (US); Bryan Christopher Horling, Belmont, MA (US); Behshad Behzadi, Freienbach (CH); Lucas Mirelmann, Zurich (CH); Michael Golikov, Merlischachen (CH); Denis Burakov, Zurich (CH); Steve Cheng, Los Altos, CA (US); Bohdan Vlasyuk, Zurich (CH); Sergey Nazarov, Zurich (CH); Mario Bertschler, Zurich (CH); Luv Kothari, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/136,189

(22) Filed: Apr. 18, 2023

(65) Prior Publication Data
US 2023/0252989 A1    Aug. 10, 2023

Related U.S. Application Data

(63) Continuation of application No. 17/521,131, filed on Nov. 8, 2021, now Pat. No. 11,631,412, which is a
(Continued)

(51) Int. Cl.
*G06F 3/16*    (2006.01)
*G10L 15/18*   (2013.01)
(Continued)

(52) U.S. Cl.
CPC .............. *G10L 15/22* (2013.01); *G06F 3/165* (2013.01); *G06F 3/167* (2013.01);
(Continued)

(58) Field of Classification Search
CPC ... G10L 2015/223; G10L 15/22; G06F 3/167; H04N 5/232
See application file for complete search history.

(56) References Cited

U.S. PATENT DOCUMENTS 9,152,600 B2 * 10/2015 Lango ................... G06F 3/0643
9,930,132 B2 *  3/2018 Gupta ................. H04L 67/5682
(Continued)

FOREIGN PATENT DOCUMENTS

| CA | 3152116 A1 | * | 4/2021 | ............. G06F 3/048 |
| CA | 3214519 A1 | * | 10/2022 | ......... H04N 21/2187 |
| TW | 202025138 A | * | 7/2020 | ............. G06F 3/167 |

OTHER PUBLICATIONS

European Patent Office, Communication issued in Application No. 23189740.6; 6 pages; dated Nov. 28, 2023.
(Continued)

*Primary Examiner* — Mohammad K Islam
(74) *Attorney, Agent, or Firm* — Gray Ice Higdon

(57) ABSTRACT

Implementations can reduce the time required to obtain responses from an automated assistant through proactive caching, locally at a client device, of proactive assistant cache entries—and through on-device utilization of the proactive assistant cache entries. Different proactive cache entries can be provided to different client devices, and various implementations relate to technique(s) utilized in determining which proactive cache entries to provide to which client devices. In some of those implementations, in determining which proactive cache entries to provide (proactively or in response to a request) to a given client device,
(Continued)

a remote system selects, from a superset of candidate proactive cache entries, a subset of the cache entries for providing to the given client device.

16 Claims, 8 Drawing Sheets

Related U.S. Application Data continuation of application No. 16/621,559, filed as application No. PCT/US2019/034911 on May 31, 2019, now Pat. No. 11,170,777.

(60) Provisional application No. 62/843,890, filed on May 6, 2019.

(51) Int. Cl.
  *G10L 15/22* (2006.01)
  *G10L 15/30* (2013.01)
  *H04L 67/01* (2022.01)
  *H04L 67/568* (2022.01)
  *H04N 23/60* (2023.01)

(52) U.S. Cl.
  CPC .......... *G10L 15/1815* (2013.01); *G10L 15/30* (2013.01); *H04L 67/568* (2022.05); *G10L 2015/223* (2013.01); *H04L 67/01* (2022.05)

(56) References Cited

U.S. PATENT DOCUMENTS

| | | |
|---|---|---|
| 9,990,176 B1 | 6/2018 | Gray |
| 10,291,735 B2* | 5/2019 | Coglitore ............... H04L 67/563 |
| 10,388,277 B1* | 8/2019 | Ghosh ................ G10L 15/1822 |
| 10,397,357 B2* | 8/2019 | Coglitore ............. H04L 67/568 |
| 10,594,827 B1* | 3/2020 | Lepeska .................. H04L 67/02 |
| 10,789,943 B1* | 9/2020 | Lapshina ............ G10L 15/1815 |
| 10,885,091 B1* | 1/2021 | Meng ................ G06F 16/24578 |
| 11,170,777 B2 | 11/2021 | Cotting et al. |
| 2014/0163977 A1 | 6/2014 | Hoffmeister et al. |
| 2014/0288932 A1* | 9/2014 | Yeracaris ................ G10L 17/10 |
| | | 704/249 |
| 2017/0097618 A1* | 4/2017 | Cipollo .................. G10L 15/22 |
| 2018/0197545 A1* | 7/2018 | Willett .................. G10L 15/005 |
| 2018/0227796 A1* | 8/2018 | Luna ..................... H04W 76/25 |
| 2019/0295552 A1* | 9/2019 | Pasko ..................... G10L 15/30 |
| 2021/0117214 A1* | 4/2021 | Presant ................ H04L 67/535 |
| 2022/0059093 A1 | 2/2022 | Cotting et al. |

OTHER PUBLICATIONS

Intellectual Property India; Hearing Notice issued in Application No. IN202127045466; 2 pages; dated Dec. 19, 2023.

Australian Government; Examination Report issued in Application No. 2022218466; 3 pages; dated Jan. 2, 2024.

* cited by examiner

| CACHE ENTRY | REQUEST PARAMETERS | ACTION CONTENT | METADATA |
|---|---|---|---|
| 1 <br> 310 | - Tomorrow's weather <br> - Weather tomorrow <br> - {Intent = weather; Day = tomorrow; Location = local} <br> 310A | - Sunny with a high of 68, and a low of 50 <br><br> H: 68　　L: 50 <br> 310B | - TTL = 12 hours <br> - Timestamp = 5/4/19, 18:50 <br> 310C |
| 2 <br> 320 | - Adjust thermostat schedule <br> - Change schedule for thermostat <br> - {Intent = thermostat ; Setting = change/adjust schedule} <br> 320A | - *Deeplink to Application #1* <br> 320B | - TTL = 30 days <br> - Timestamp = 5/3/19, 18:12 <br> 320C |
| 3 <br> 330 | - John Doe's net worth <br> - How much is John Doe worth <br> 330A | - $50 million <br> 330B | - TTL = 7 days <br> - Timestamp = 5/2/19, 13:45 <br> 330C |

FIG. 3

PROACTIVE CACHING OF ASSISTANT ACTION CONTENT TO ENABLE RESOLUTION OF SPOKEN OR TYPED UTTERANCES

BACKGROUND

Humans can engage in human-to-computer dialogs with interactive software applications referred to herein as "automated assistants" (also referred to as "digital agents," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., spoken utterances), which may in some cases be converted into text and then processed, and/or by providing textual (e.g., typed) natural language input (i.e., typed utterances). An automated assistant responds to a request by providing responsive user interface output, which can include audible and/or visual user interface output.

As mentioned above, many automated assistants are configured to be interacted with via spoken utterances. A user may submit queries and/or commands to an automated assistant interface of a client device via a spoken utterance, verbally indicating what information the user has interest in being provided and/or an action that the user has interest in being performed. Typically, the spoken utterance is detected by microphone(s) of the client device and captured as audio data. The audio data is transmitted to a remote system for further processing. The remote system processes the audio data to determine an appropriate response, and transmits the response to the client device.

Components of a remote system can devote substantial computing resources to processing audio data, enabling more complex speech recognition and semantic analysis functionality to be implemented than could otherwise be implemented locally within a client device. However, a client-server approach necessarily requires that a client be online (i.e., in communication with the remote systems) when processing voice input. In various situations, continuous online connectivity may not be guaranteed at all times and in all locations, so a client-server voice-based user interface may be disabled in a client device whenever that device is "offline" and thus unconnected to an online service. Further, a client-server approach can consume significant bandwidth, as it requires transmission of high-bandwidth audio data from a client to components of a remote system. The consumption of bandwidth is amplified in the typical situations where the remote system is handling requests from a large quantity of client devices. Yet further, a client-server approach can exhibit significant latency in provisioning of responses to a user, which can cause voice-based user-client interactions to be protracted, and resources of the client device to be utilized for a protracted duration.

SUMMARY

Implementations disclosed herein serve to reduce the time required to obtain responses from an automated assistant through proactive caching, locally at a client device, of proactive assistant cache entries—and through on-device utilization of the proactive assistant cache entries.

In various implementations, an automated assistant application operating on a client device can use on-device speech processing to process locally detected audio data and generate recognized text that corresponds to a spoken utterance (e.g., user interface input) captured by the audio data. The automated assistant application can further utilize the recognized text and/or natural language understanding (NLU) data, generated by on-device NLU, to identify a locally stored proactive cache entry that corresponds to the spoken utterance. The identification can also be performed based on other user interface input, such as typed phrases or utterances. The locally stored proactive cache entry can be identified by determining that the recognized text and/or the NLU data (from the typed or spoken utterance) match assistant request parameters of the proactive cache entry. The automated assistant application, responsive to determining the match, can then respond appropriately to the spoken utterance using action content of the identified proactive cache entry. The response of the automated assistant application can include, for example: executing a deeplink included in the action content; rendering text, graphics, and/or audio (or audio data converted from the response using an on-device speech synthesizer) included in the content; and/or transmitting (e.g., via WiFi and/or Bluetooth) a command to peripheral device(s) to control the peripheral device(s). Further, the response of the automated assistant application can be provided, optionally without any live communication with a server, or at least not requiring awaiting for the response from the server—thereby further reducing the time in which a response can be provided.

As described in more detail herein, one or more (e.g., all) proactive cache entries that are stored in a local proactive cache of a client device are "proactive" in that they are not stored in the proactive cache responsive to having been recently requested at the client device based on user input. Rather, a proactive cache entry can be proactively prefetched from a remote system, such as a server, and then stored in the proactive cache—despite user input never having been received that conforms to the assistant request parameters of the proactive cache.

Different proactive cache entries can be provided to different client devices, and various implementations disclosed herein relate to technique(s) utilized, by the remote system, in determining which proactive cache entries to provide to which client devices. In some of those implementations, in determining which proactive cache entries to provide (proactively or in response to a request) to a given client device, the remote system selects, from a superset of candidate proactive cache entries, a subset of the cache entries for providing to the given client device. Various considerations can be utilized in selecting the subset, including considerations that take into account attribute(s) of the given client device and/or one or more attributes of the proactive cache entries. Attribute(s) of/for the client device can include any data associated with operation of the client device, such as, for example, data associated with a version level of the operating system, a model of client device, which applications are installed on a client device (and which versions), a search history of a user of the client device, a location history of the client device, a power mode or battery level of the client device, etc.

As one example, in selecting one or more proactive cache entries of the subset, which applications are installed on the given client device (and optionally which of those are implicitly or explicitly flagged as preferred) can be considered and compared to action content (and/or metadata) of the candidate proactive cache entries. For example, multiple candidate proactive cache entries can be generated that each have the same assistant request parameters, but different action content. The different action content of each can be tailored to a particular application and can be, for example, a corresponding deeplink that is locally executable by an assistant client application to cause a corresponding additional application to open in a first state for performing the given action. For instance, assume assistant request parameters of "adjust thermostat schedule", "change schedule of thermostat", and/or "{intent=change/adjust; device=thermostat; property=schedule}". For such assistant request parameters, various different applications could be utilized to effectuate an appropriate response such as a first application for a first thermostat manufacturer and a second application for a second thermostat manufacturer. First and second proactive cache entries can both have the same assistant request parameters, but include different deeplinks. For instance, the first proactive cache entry can have a first deeplink for the first application (that when executed causes the first application to open at a corresponding schedule change interface) and the second proactive cache entry can have a distinct second deeplink for the second application (that when executed causes the second application to open at a corresponding schedule change interface).

In such an example, the first proactive cache entry (but not the second) can be selected for provisioning to a given client device based on determining the given client device has the first application installed, but not the second application. This enables the given client device to quickly and efficiently respond to a typed or spoken utterance that conforms to the assistant request parameters, as it can select the sole first deeplink of the action content of that entry—without having to locally determine which of multiple disparate deeplinks should be utilized. Moreover, the action content of the first and second proactive cache entries are reduced, storage space wise, relative to action content that includes multiple disparate deeplinks. This enables each of them to be individually more efficiently stored in a corresponding local proactive cache—and to consume less bandwidth in transmission to corresponding client devices. Fewer computer and network resources may therefore be consumed. Moreover, the use of deeplinking in the proactive cache entries may facilitate the performance of an action with fewer user inputs and fewer processing steps, which may reduce the resources consumed by the client device in performing the action. The requirement for fewer user inputs may also be beneficial for users with decreased dexterity, and may improve the utility of the device.

As another example, in selecting one or more proactive cache entries of the subset, proactive cache entries that relate to an entity with one or more determined event(s) can be more likely to be selected, optionally in dependence on a magnitude of the event. Moreover, a proactive cache entry for an entity can even be generated in response to determining occurrence of the event. Some examples of determining an event for an entity are: determining an increase in requests related to the entity; determining an increase in Internet content for the entity; and/or predicting an increase in requests related to the entity.

For instance, if a quantity of assistant requests (and/or traditional search requests) for "Jane Doe" is determined to spike, along with a spike in Internet content for "Jane Doe", proactive cache entries related to Jane Doe can be generated and/or can be more likely to be provided to various client devices for local proactive caching (more likely than before the spikes). Providing the proactive cache entries for "Jane Doe" to various client devices can optionally further be based on determining those various client devices have corresponding attribute(s) that relate to Jane Doe (e.g., past searches for Jane Doe and/or related entities (e.g., other entities of the same type); a geographic location that is relevant to Jane Doe; and/or other attributes).

In these and other manners, proactive cache entries for entities can be provided in anticipation of continued requests for the entities (and the associated bandwidth consumption and associated server side processor consumption for handling the requests) to enable eventual requests to be responded to more quickly. Moreover, the provisioning of the proactive cache entries for many client devices can occur during periods of relatively low network usage (e.g., at night when those client devices are idle and charging)—enabling usage of network resources at the low usage periods while mitigating network resource usages during higher usage periods. In other words, the proactive cache entry for Jane Doe can be pre-stored at a client device during a low-usage period, then utilized to locally respond to a typed or spoken utterance at the client device during the high usage period. When this occurs across a large quantity of client devices, as contemplated herein, it can enable effective redistribution of network resources. Network performance may therefore be improved. Further, various implementations select only a subset of client devices for provisioning with proactive cache entries for "Jane Doe" and select the subset based on the client device of the subset having attribute(s) that related to Jane Doe. By selecting and providing the proactive cache entries to only the subset, reduction in usage bandwidth and network resources can be achieved. Such reductions can be achieved, while still selectively utilizing network resources to provision proactive cache entries to client devices likely to utilize such entries, effectuating faster provisioning of responses at those client devices and reduced interaction duration with those client devices.

As another example of determining and utilizing an event for an entity, an increase in requests related to a Hypothetical Artist (in this example, a hypothetical musical artist) can be predicted, despite the increase in requests having not yet been observed. For instance, the increase in requests can be predicted based on determining, from one or more additional systems, that Hypothetical Artist is slated to release a new song and/or new album. In response to the prediction of the increase in requests, proactive cache entries related to Hypothetical Artist can be generated and/or can be more likely to be provided to various client devices for local proactive caching (more likely than before the spikes). For example, a proactive cache entry having assistant request parameters of "play Hypothetical Artist", "listen to some Hypothetical Artist", and/or "{intent=listen to music; artist=Hypothetical Artist}". The proactive cache entry can further include assistant action content such as, for example, one or more deeplinks that, when executed, each cause a corresponding application to open in a state in which music from Hypothetical Artist is streamed and audibly rendered at a client device. Providing the proactive cache entry for "Hypothetical Artist" to various client devices can optionally further be based on determining those various client devices have corresponding attribute(s) that relate to Hypothetical Artist (e.g., past streaming of music from Hypothetical Artist and/or related musical artists, music files from Hypothetical Artist stored on said device, search history related to Hypothetical Artist, etc.). Providing the proactive cache entry to a given client device can also be based on determining that the given client device has an application that corresponds to one of the deeplink(s) (e.g., to the only deeplink in some implementations) of the proactive cache entry.

In addition to local proactive caches that are each locally stored at a corresponding client device, some implementations can further include remote proactive caches that are each generated for a subset of client devices. The subset of client devices for a remote proactive cache can be a single client device, or a group of client devices that are grouped based on those client devices having attribute(s) in common with one another. For example, a remote proactive cache can be for only a single client device, or can be for one thousand client devices that have the same or similar attributes.

A remote proactive cache for a given client device (for solely the given client device, or the given client device and other client device(s) with same/similar attribute(s)) includes (or is restricted to) proactive cache entries that are in addition to those stored in a local proactive cache of the given client device. The proactive cache entries of the remote proactive cache are, in many implementations, still a subset of all available candidate cache entries. The proactive cache entries of the remote proactive cache can include those determined to be relevant to the given client device based on attribute(s) of the given client device and/or attribute(s) of the proactive cache entries (e.g., based on comparison of the client device attribute(s) and the proactive cache entries attribute(s) and/or based on the proactive cache entries attribute(s)). However, the proactive cache entries of the remote cache include those that are not provided for local storage in the local proactive cache. The decision to not provide them for local storage in the local proactive cache can be based on storage space restrictions for the local proactive cache (e.g., providing them would cause a storage limit for the local proactive cache to be exceeded) and based on those entries being determined to be less relevant than those provided for storage in the local proactive cache of the given client device. In other words, the remote proactive cache for a given client device can include proactive cache entries that are determined to be relevant to the given client device, but not stored in the local cache of the given client device based on storage space restrictions and based on the proactive cache entries being determined to be less relevant than those provided for local storage in the local proactive cache of the given client device.

A remote proactive cache can be utilized by remote automated assistant component(s) when responding to assistant requests from client device(s) that are assigned to the remote proactive cache. For example, for a spoken utterance detected in audio data at a given client device, the given client device can transmit the audio data and/or locally determined recognized text to the remote automated assistant component(s). The transmission to the remote automated assistant component(s) can optionally be responsive to determining no local proactive cache entry is responsive, or can occur in parallel with determining whether a local proactive cache entry is responsive. The transmission can be accompanied by an identifier of the given client device, and the identifier utilized to identify a remote proactive cache for the given client device. A remote fulfillment module, of the automated assistant component(s) can determine whether a remote proactive cache entry is responsive to the assistant request. If so, the remote fulfillment module can utilize the responsive entry to determine assistant action content for responding to the assistant request. The assistant action content can be executed remotely by remote automated assistant component(s) and/or transmitted to the given client device for local execution.

Utilization of the remote proactive cache by remote automated assistant component(s) enables the remote automated assistant component(s) to more quickly respond to an automated assistant request (e.g. a typed or spoken utterance directed to an automated assistant that requests performance of a given action). This can be a result of an assistant action being directly mapped to assistant request parameters in a proactive cache entry, enabling identification of the assistant action efficiently from the proactive cache entry and without having to generate the assistant action live in response to the assistant request. For example, absent an assistant action in a proactive cache entry, the assistant action would have to be generated on the fly, optionally through communications with one or more additional remote systems, which can be computationally burdensome and introduce latency as a result of the communications with the additional remote system(s). Thus, although a client-server roundtrip is needed, utilization of the remote proactive cache in resolving an assistant request still provides for reduced latency provisioning of responses and, as a result, reduced duration of the user-assistant interaction. Moreover, in some implementations a remote proactive cache that is specific to a subset of client device(s) can be stored at one or more servers that are geographically proximate to the client device(s) of the subset, such as server(s) that receive assistant requests from a given geographic region. This can further reduce latency in resolving an assistant request, as the assistant action can be determined more quickly from the proactive cache, without necessitating server to server communications between multiple geographically distance servers.

Various implementations disclosed herein are directed to client devices (e.g., smartphones and/or other client devices) that include at least one or more microphones and an automated assistant application. The automated assistant application can be installed "on-top of" an operating system of the client device and/or can itself form part of (or the entirety of) the operating system of the client device. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the client device. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data. NLU data can include intent(s) that correspond to the spoken utterance and optionally parameter(s) (e.g., slot values) for the intent(s).

On-device fulfillment can be performed using an on-device fulfillment module that utilizes the recognized text (from the on-device speech recognition) and/or the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to Internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance. As described herein, in various implementations the on-device fulfillment utilizes a locally stored proactive cache in responding to various user inputs. For example, the on-device fulfillment can utilize action content, of a proactive cache entry of the locally stored proactive cache, in responding to a spoken utterance based on determining that recognized text and/or NLU data match assistant request parameters of the proactive cache entry.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In various implementations, on-device speech recognition and/or other on-device processes are activated responsive to detecting occurrence an explicit assistant invocation cue and/or responsive to some occurrences of implicit invocation cue(s). An explicit invocation cue is one that, when detected in isolation, will always cause at least on-device speech recognition to be activated. Some non-limiting examples of explicit invocation cues include detecting a spoken hot-word with at least a threshold degree of confidence, an actuation of an explicit assistant interface element (e.g., hardware button or graphical button on a touch-screen display), a "phone squeeze" with at least threshold strength (e.g., as detected by sensor(s) in a bezel of a mobile phone), and/or other explicit invocation cue(s). However, other cue(s) are implicit in that on-device speech recognition will only be activated responsive to some occurrences of those cue(s) such as occurrence(s) in certain context(s) (e.g., occurrence(s) following or in combination with other implicit cue(s)). For example, on-device speech recognition can optionally not be activated responsive to detecting voice-activity standing alone, but may be activated responsive to detecting voice activity along with detecting, at the client device, user presence and/or detecting, at the client device, user presence within a threshold distance. Also, for example, sensor data from non-microphone sensor(s) such as gyros and/or accelerometers that indicate a user has picked up the client device and/or is currently holding the client device can optionally not, standing alone, activate on-device speech recognition. However, on-device speech recognition may be activated in response to such indications along with detecting voice activity and/or directed speech (described in more detail herein) in hot-word free audio data. Hot-word free audio data is audio data that lacks any spoken utterance that includes a "hot-word" that is an explicit assistant invocation cue. As yet another example, a "phone squeeze" with less than the threshold strength can optionally, standing alone, be insufficient to activate on-device speech recognition. However, on-device speech recognition may be activated in response to such a low strength "phone squeeze" along with detecting voice activity and/or directed speech in hot-word free audio-data.

Some implementations disclosed herein include one or more computing devices that include one or more processors such as central processing unit(s) (CPU(s)), graphics processing unit(s) (GPU(s)), and/or tensor processing unit(s) (TPU(s)). One or more of the processors are operable to execute instructions stored in associated memory, and the instructions are configured to cause performance of any of the methods described herein. The computing devices can include, for example, client assistant devices with microphone(s), a display, and/or other sensor component(s). Some implementations also include one or more non-transitory computer readable storage media storing computer instructions executable by one or more processors to perform any of the methods described herein.

BRIEF DESCRIPTION OF THE DRAWINGS

FIG. 3 illustrates some examples of proactive cache entries.

DETAILED DESCRIPTION

Figure 1:
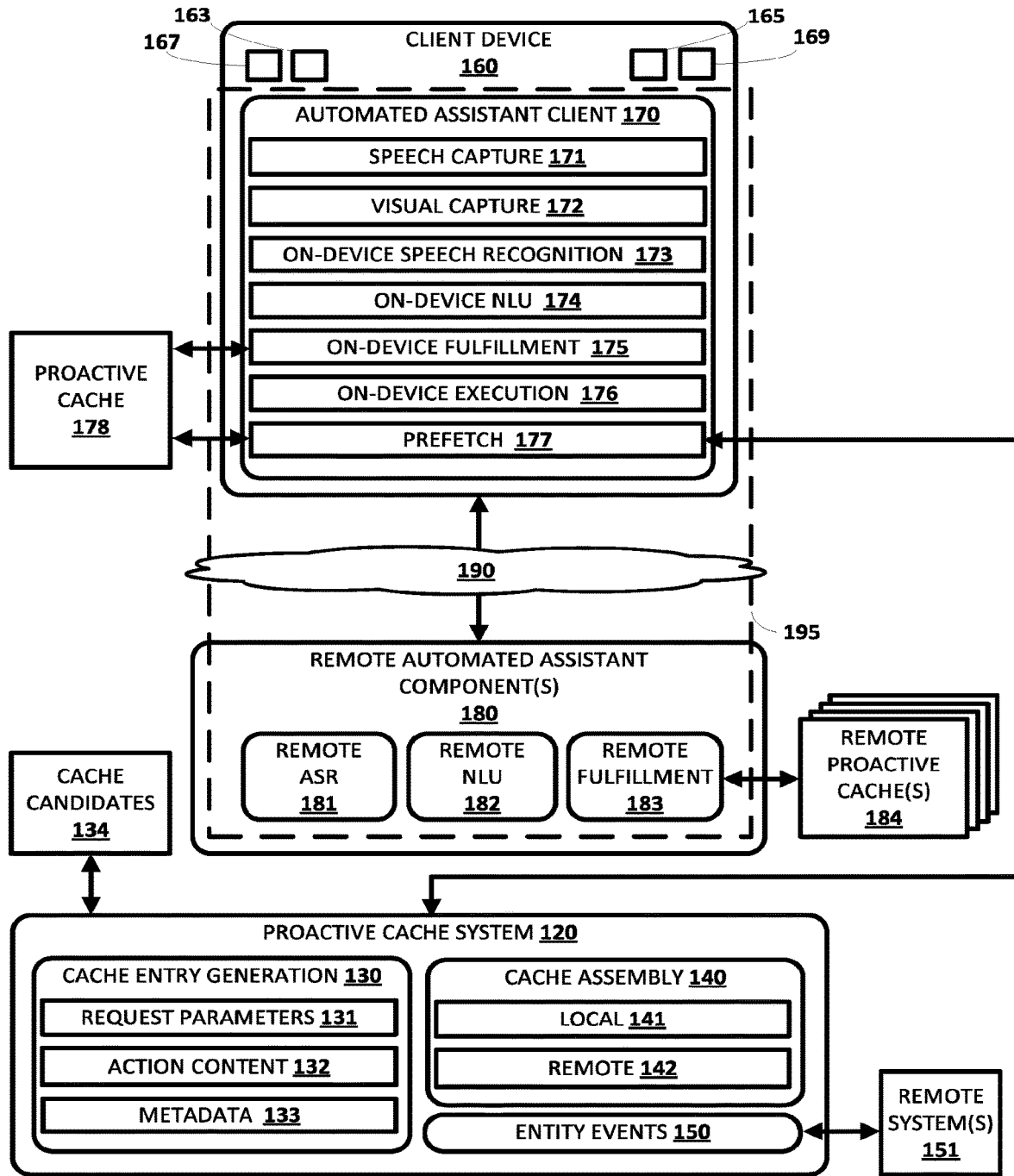
FIG. 1 is a block diagram of an example environment in which implementations disclosed herein can be implemented.

Turning initially to FIG. 1, a client device 160 is illustrated that at least selectively executes an automated assistant client 170. The term "assistant device" is also used herein to reference a client device 160 that at least selectively executes an automated assistant client 170. The automated assistant client 170 includes, in the example of FIG. 1, speech capture engine 171, visual capture engine 172, on-device speech recognition engine 173, on-device NLU engine 174, on-device fulfillment engine 176, on-device execution engine 176, and prefetch engine 177.

One or more remote automated assistant components 180 can optionally be implemented on one or more computing systems that are communicatively coupled to client device 160 via one or more local and/or wide area networks (e.g., the Internet) indicated generally at 190. The remote automated assistant components 180 can be implemented, for example, via a cluster of high-performance servers.

In various implementations, an instance of an automated assistant client 170, by way of its interactions with one or more cloud-based automated assistant components 180, may form what appears to be, from a user's perspective, a logical instance of an automated assistant 195 with which the user may engage in a human-to-computer interactions (e.g., spoken interactions, gesture-based interactions, and/or touch-based interactions).

The client device 160 can be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided.

Client device 160 can optionally be equipped with one or more vision components 163 having one or more fields of view. Vision component(s) 163 can take various forms, such as monographic cameras, stereographic cameras, a LIDAR component (or other laser-based component(s)), a radar component, etc. The one or more vision components 163 may be used, e.g., by visual capture engine 174, to capture vision frames (e.g., image frames, laser-based vision frames) of an environment in which client device 160 is deployed. In some implementations, such vision frame(s) can be utilized to determine whether a user is present near the client device 160 and/or a distance of the user (e.g., the user's face) relative to the client device. Such determination(s) can be utilized by automated assistant client 170 in determining whether to activate on-device speech recognition engine 173, on-device NLU engine 174, n-device fulfillment engine 175, and/or on-device execution engine 176. Vision frame(s) can additionally or alternatively be utilized to locally detect various user touch-free gestures (e.g., "thumbs up", "hand wave", etc.). Optionally a detected gesture can be the "assistant request parameters" of a proactive cache entry described herein and corresponding actions to be taken based on the gesture can be the "action content" of the proactive cache entry.

Client device 160 can also be equipped with one or more microphones 165. Speech capture engine 172 can be configured to capture user's speech and/or other audio data captured via microphone(s) 165. As described herein, such audio data can be utilized by on-device speech recognition engine 173.

Client device 160 can also include one or more presence sensors 167 and/or one or more displays 169 (e.g., a touch-sensitive display). Display(s) 169 can optionally be utilized to render streaming text transcriptions from the on-device speech recognition engine 173. Display(s) 169 can further be one of the user interface output component(s) through which visual portion(s) of a response, from automated assistant client 170, is rendered. Presence sensor(s) 167 can include, for example, a PIR and/or other passive presence sensor(s). In various implementations, one or more component(s) and/or function(s) of the automated assistant client 170 can be initiated responsive to a detection of human presence based on output from presence sensor(s) 167. In implementations where initiating component(s) and/or function(s) of the automated assistant client 170 is contingent on first detecting presence of one or more users, power resources can be conserved.

Automated assistant client 170 activates on-device speech recognition engine 173 responsive to detecting occurrence of an explicit invocation cue and/or detecting the occurrence of implicit invocation cue(s). When activated, the on-device speech recognition engine 173 processes audio data, captured by the microphone(s) 165, using an on-device speech recognition model (not illustrated in FIG. 1 for simplicity) to determine recognized text in a spoken utterance (if any) captured by the audio data. The on-device speech recognition model can optionally be an end-to-end model, and can optionally be supplemented by one or more techniques that seek to generate additional recognized text hypotheses, and choose the best hypothesis using various considerations. The audio data processed can include audio data captured after the on-device speech recognition is activated, and optionally locally buffered recent audio data (e.g., buffered prior to activation of the on-device speech recognition engine 173). The audio data processed by the on-device speech recognition engine 173 can include the raw audio data, and/or a representation thereof. The audio data can be provided to the on-device speech recognition engine 173 in a streaming fashion as new audio data is detected.

In some implementations, when on-device speech recognition engine 173 is activated, human perceptible cue(s) are rendered to inform the user that such activation has occurred and/or to render a stream of the recognized text as the recognition is occurring. The visual rendering can also include a selectable "cancellation" element that, when selected via touch input at the touch-screen display, halts the on-device speech recognition engine 173. Activating speech recognition engine 173 or other component, as used herein, means at least causing it to perform processing beyond what it was previously performing prior to activation. It can mean activating it from a fully dormant state.

On-device NLU engine 174, on-device fulfillment engine 175, and/or on-device execution engine 176 can optionally be activated responsive to detecting the occurrence of the explicit and/or implicit invocation cues. Alternatively, one or more of the engines may only be activated based on an initial analysis, of recognized text from on-device speech recognition engine 173, indicating that the recognized text is likely an assistant request.

When on-device NLU engine 174 is activated, the on-device NLU engine 174 performs on-device natural language understanding on the recognized text, generated by on-device speech recognition engine 173, to generate NLU data. NLU engine 174 can optionally utilize one or more on-device NLU models (not illustrated in FIG. 1 for simplicity) in generating the NLU data. NLU data can include, for example, intent(s) that correspond to the spoken utterance and optionally parameter(s) (e.g., slot values) for the intent(s).

Further, when the on-device fulfillment engine 145 is activated, on-device fulfillment engine 145 generates fulfillment data using the recognized text (from on-device speech recognition engine 173) and/or using the NLU data (from on-device NLU engine 174). On-device fulfillment engine 145 can access proactive cache 178, which is locally stored at the client device 160, in determining whether the recognized text and/or NLU data matches the assistant request parameters of a proactive cache entry of the proactive cache. If so, the on-device fulfillment engine 145 can utilize the action content, of the matching proactive cache entry, as all or part of the generated fulfillment data. The action content can comprise an action to be taken based on the request and/or data associated with fulfilling such a request. If not, the on-device fulfillment engine 145 can optionally utilize other on-device fulfillment model(s) (if any) in attempting to generate fulfillment data, or can await remote fulfillment data from remote automated assistant component(s) 180 (e.g., when automated assistant client 170 is online and provides recognized text and/or other data to remote automated assistant component(s) 180 for generating fulfillment data). The combination of on-device speech recognition and a local proactive cache can reduce the need for transmitting data to/from a server, and so reduce the use of bandwidth and network resources. Moreover, low latency responses can be provided to a user even in areas with poor or no network connectivity.

In determining whether recognized text or NLU data matches the assistant request parameters of a proactive cache entry of the proactive cache, the on-device fulfillment engine 145 can utilize exact matching and/or soft matching. For example, in determining whether recognized text matches the assistant request parameters, the on-device fulfillment engine 145 can require exact matching of the recognized text to text of the assistant request parameters, or only allow minimal variation (e.g., inclusion or exclusion of certain stop words). Also, for example, in determining whether NLU data matches the assistant request parameters, the on-device fulfillment engine 145 can require exact matching of the NLU data to NLU data of the assistant request parameters. While various examples are described herein with respect to recognized text determined by on-device speech recognition, it is understood that typed text (e.g., typed using a virtual keyboard) and/or NLU data based on the typed text can also be provided and responded to in a similar manner.

When fulfillment data is generated by on-device fulfillment engine 175, the fulfillment data can then be provided to on-device execution engine 176 for on-device execution based on the fulfillment data (e.g., on-device performance of action(s) based on the action content of a proactive cache entry). The on-device execution based on the action content of the fulfillment data can include, for example: executing a deeplink included in the action content; rendering text, graphics, and/or audio (or audio data converted from the response using an-on device speech synthesizer) included in the action content; and/or transmitting (e.g., via WiFi and/or Bluetooth) a command, included in the action content, to peripheral device(s) to control the peripheral device(s).

The prefetch engine 177 prefetches, from proactive cache system 120, proactive cache entries for inclusion in the proactive cache 178. One or more proactive cache entries that are prefetched and stored, in the proactive cache 178, can be proactive cache entries with assistant request parameters that don't conform to any user inputs previously provided to the automated assistant client 170 and/or with action content that has never been utilized by the automated assistant client 170. Thus, such cache entries can reduce the amount of time to provide an assistant response for various user inputs that have never been received at the automated assistant client 170.

In some implementations and/or situations, the proactive cache system 120 can optionally push proactive cache entries to prefetch engine 177. However, in other implementations and/or situations, the proactive cache system 120 transmits proactive cache entries responsive to a prefetch request from prefetch engine 177. In some of those implementations, the prefetch engine 177 transmits the prefetch request responsive to determining one or more condition(s) are satisfied. The condition(s) can include, for example, one or more of: that certain network condition(s) are present (e.g., a connection to a Wi-Fi network and/or a connection to a Wi-Fi network that has certain bandwidth condition(s)); that the client device 160 is charging and/or has at least a threshold battery state of charge; that the client device is not being actively utilized by a user (e.g., based on on-device accelerometer and/or gyroscope data); that current processor usage and/or current memory usage of the client device do not exceed certain thresholds; etc. Accordingly, proactive cache entries can be retrieved during periods when certain ideal condition(s) are present, but subsequently utilized under any condition(s)—including those where the certain ideal condition(s) are not present.

A prefetch request from the prefetch engine 177 can include an identifier of the client device 160 and/or of an account associated with the client device, and/or can include another indication of the proactive cache entries that are already stored in the proactive cache 178. The proactive cache system 120 can utilize the indication, of the proactive cache entries that are already stored in the proactive cache 178, to provide, in response to the prefetch request, only proactive cache entries that are not already stored in the proactive cache. This can conserve network resources by only transmitting new/updated proactive cache entries for adding to the proactive cache 178, instead of transmitting new/updated proactive cache entries along with existing cache entries for fully supplanting the proactive cache 178. As one example, the proactive cache system 120 can maintain, for an identifier of the client device 160, a listing of active proactive cache entries in the proactive cache 178. The proactive cache system 120 can utilize such a listing in determining which new/updated proactive cache entries to provide in response to a prefetch request that includes the identifier. As another example, the prefetch request can include a token or other identifier that maps to a set of proactive cache entries stored in the proactive cache 178, and the proactive cache system 120 can utilize such a token in determining which new/updated proactive cache entries are not in the mapped set and should be provided in response to a prefetch request that includes the token.

The prefetch engine 177 can also selectively remove proactive cache entries from the proactive cache 178. For example, a proactive cache entry can include a time to live (TTL) value as part of its metadata. The TTL value can define a duration, or a threshold period of time, after which the proactive cache entry can be considered stale and, as a result, is not utilized by on-device fulfillment engine 175 and/or is removed from the proactive cache 178 by the prefetch engine 177. For example, if the TTL value of a proactive cache entry indicates it should live for 7 days, and a timestamp of the proactive cache entry indicates it was received 8 days ago, the prefetch engine 177 can remove the proactive cache entry from the proactive cache 178. This can free limited storage resources of the client device 160, and make room for other timely proactive cache entries in the proactive cache 178, whose overall size can be constrained due to the limited storage resources of the client device 160.

In some implementations, the prefetch engine 177 can additionally or alternatively remove proactive cache entries from the proactive cache 178 to make room for new proactive cache entries, despite one or more of the removed proactive cache entries not being indicated as stale based on their TTL values. For example, the proactive cache 178 can have a maximum size that can be, for example, user-set and/or determined based on storage capacity of the client device 160. If new proactive cache entries from a prefetch request would exceed the maximum size, the prefetch engine 177 can remove one or more existing cache entries to make room for the new proactive cache entries. In some implementations, proactive cache entries can be removed based on a timestamp of the cache entry, for example, the oldest proactive cache entries may be removed first by the prefetch engine 177. In some implementations, metadata for existing proactive cache entries can include a score, ranking, or other priority data (also referred to herein more generally as ranking metric(s)), and those having the lowest priority can be removed by the prefetch engine 177. Additionally or alternatively, prefetch engine 177 can bias toward removing proactive cache entries that have never been utilized, optionally also considering their timestamp to bias toward those that have never been utilized and have been present in the proactive cache for at least a threshold duration of time. Additionally or alternatively, proactive cache system 120 can optionally provide, in response to a prefetch request, an indication of what existing proactive cache entries should be removed.

The proactive cache system 120 generates proactive cache entries and responds to prefetch requests, from client device 160 and other client devices, with proactive cache entries that are selected for the requesting client device. The proactive cache system 120 can further generate remote proactive cache(s) 184 that are utilized by remote automated assistant component(s) 180 and that can each be specific to one or more client devices.

The proactive cache system 120 can include a cache entry generation engine 130, a cache assembly engine 140, and an entity events engine 150. Generally, the cache entry generation engine 130 generates a large quantity of candidate proactive cache entries (referenced in FIGS. 1 and 2 as cache candidates 134) utilizing various techniques described herein. The cache assembly engine 140 determines, for each of a plurality of client devices, a corresponding subset of the cache candidates 134 that should be provided to the corresponding client device for storage in a local proactive cache of the corresponding client device. The cache assembly engine 140 can also optionally generate remote proactive cache(s) 184, that are each associated with a subset of client devices and that each include a corresponding subset of the cache candidates, and that are each utilized by remote automated assistant component(s) 180 in fulfillment for corresponding client device(s). The entity events engine 150 can determine, optionally though interfacing with one or more remote systems 151, occurrence of events related to various entities. In some implementations, the entity events engine 150 can provide information related to those events to the cache entry generation engine 130 to cause the cache entry generation engine 130 to generate one or more corresponding cache candidates 130 for the entity. In some implementations, the entity events engine 150 can additionally or alternatively provide information related to those events cache assembly engine 140, which can use the information in determining whether to provide various cache candidates to corresponding client devices and/or for inclusion in remote proactive cache(s) 184.

In FIG. 1, the cache entry generation engine 130 includes a request parameters module 131, an action content module 132, and a metadata module 133. The request parameters module 131 generates assistant request parameters for each proactive cache entry. The assistant request parameters of a proactive cache entry represent one or more assistant requests for performing given action(s). An assistant request can be a typed or spoken utterance that requests performance of a given action. For example, multiple assistant requests can each be a request for rendering a local forecast for the current day such as the following typed or spoken utterances: "today's forecast", "today's local forecast", "what's the weather for today", and "how's the weather". The request parameters module 131 seeks to generate textual representations and/or NLU representations that capture those multiple assistant requests for performing the same given action(s). For example, the text of each of the preceding utterances can be included as assistant request parameters, and/or an NLU representation that is common to all of the utterances, such as a structured representation of {intent=weather; location=local; date=today}".

The action content module 132 generates action content for each proactive cache entry. The action content can vary from proactive cache entry to proactive cache entry. Action content for a proactive cache entry can include, for example, a deeplink to be executed; text, graphics, and/or audio to be rendered; and/or commands to be transmitted to a peripheral device.

Continuing with the local forecast for the current day example, the action content module 132 can generate different action content for each of multiple cache entries, with the action content for each being tailored to a different geographic region. For example, a first proactive cache entry can be for a first city and include assistant request parameters and first action content that includes text, graphics, and/or audio to be rendered and that specifies the daily forecast for the first city. The second proactive cache entry can be for a second city and include the same (or similar) assistant request parameters, but include second action content that includes text, graphics, and/or audio to be rendered and that specifies a disparate daily forecast for the second city. As described with respect to cache assembly engine 140, these two disparate cache entries can be provided to different client devices and/or remote proactive cache(s) 184 based on attribute(s) of the client devices. For example, a first client device in the first city can be provided with the first proactive cache entry, but not the second proactive cache entry.

In some implementations, the action content module 132 can generate different action content for each of multiple cache entries, with the action content for each being tailored to one or more different application(s). For example, a first proactive cache entry can include assistant request parameters of "play Hypothetical Artist", "listen to some Hypothetical Artist", and/or "{intent=listen to music; artist=Hypothetical Artist}". A second proactive cache entry can include the same (or similar) assistant request parameters. Nonetheless, the action content module 132 can generate, for the first proactive cache entry, first action content that includes a deeplink that, when executed, causes a first music application to open in a state that causes Hypothetical Artist's music to begin streaming. The action content module 132 can generate, for the second proactive cache entry, second action content that includes a different deeplink that, when executed, causes a second music application to open in a state that causes Hypothetical Artist's music to begin streaming. As described with respect to cache assembly engine 140, these two disparate cache entries can be provided to different client devices and/or remote proactive cache(s) 184 based on attribute(s) of the client devices. Namely, based on which application(s) the client devices have installed and/or indicated as preferred applications for music streaming. For example, a first client device having the first application as the only music streaming application can be provided with the first proactive cache entry, but not the second proactive cache entry.

For some assistant request parameters there may be only a single proactive cache entry. For example, for assistant request parameters that relate to assistant request(s) that seek an image of a Cavalier King Charles Spaniel (a breed of dog), a single proactive cache entry can be provided that includes action content with an image of a Cavalier King Charles Spaniel.

The metadata module 133 optionally generates metadata for cache entries. Some of the metadata can optionally be utilized by the proactive cache system 120 without necessarily being transmitted to client devices. For example, metadata module 133 can generate metadata for a proactive cache entry that indicates one or more entities associated with the proactive cache entry, a language of action content for the proactive cache entry, and/or other data for the proactive cache entry. The cache assembly engine 140 can utilize such metadata in determining which client device(s) should be provided with the proactive cache entry. For instance, for a proactive cache entry that includes, as action content, a local weather forecast for a first city, metadata module 133 can generate metadata that indicates the first city. Cache assembly engine 140 can utilize such metadata in selecting the proactive cache entry for inclusion in local or remote proactive caches only for client device(s) having the first city as a current or preferred location. Also, for instance, for a proactive cache entry that includes, as action content, graphics and/or texts related to an actress, metadata module 133 can generate metadata that indicates the actress. Cache assembly engine 140 can utilize such metadata in selecting the proactive cache entry for inclusion in local or remote proactive caches only for client device(s) having attribute(s) that correspond to the actress. For example, client device(s) that have attribute(s) indicating the actress based on previously viewing content about the celebrity and/or have attributes indicating a movie/show in which the actress starred based on streaming movies or television shows that include the actress.

Metadata module 133 can also generate metadata that is transmitted to the client devices with a proactive cache entry and/or utilized in maintaining remote proactive caches. For example, the metadata module 133 can generate a timestamp for a proactive cache entry that indicates when it was generated and/or last verified (e.g., verification of the accuracy of the action content). The metadata module 133 can also generate a TTL value for a proactive cache entry. The TTL value for a given proactive cache entry can be generated based on various considerations such as properties of the assistant request parameters and/or the action content. For example, some action content, such as action content related to weather, is dynamic and proactive cache entries with such action content can have a relatively short TTL (e.g., 6 hours, 12 hours). On the other hand, some action content is static and proactive cache entries with such action content can have a relatively long TTL (e.g., 7 days, 14 days, 30 days). As another example, proactive cache entries that include static content but that are provided and/or generated based on an event detection by entity events engine 150 can have a shorter TTL than proactive cache entries that include static content but that are provided and/or generated independent of any event detection by entity events engine 150.

In FIG. 1, the cache assembly engine 140 includes a local module 141 and a remote module 142. The local module 141 selects, from cache candidates 134 and for each client device, a corresponding subset of the cache candidates 134 to provide to the client device. The local module 141 can determine the subset to provide to a given client device based on various considerations such as comparison of attribute(s) of the client device to attribute(s) of the proactive cache entries, and/or ranking metric(s) for the proactive cache entries.

For example, in selecting the subset for a given client device, the local module 141 can filter out any proactive cache entries whose metadata indicates: its action content is applicable to only (e.g., deeplink(s) only for) corresponding application(s) not installed on the given client device; its action content is applicable to only geographic region(s) not associated with the given client device; its action content is only in language(s) that are not set as primary (and optionally secondary) language(s) for the given client device. Remaining proactive cache entries can be selected based on comparison of their attribute(s) to attribute(s) of the given client device, ranking metric(s) for the remaining proactive cache entries (which can also be considered attribute(s)), and/or other consideration(s).

For example, the local module 141 can be more likely to select proactive cache entries that have metadata indicating one or more entities that correspond to one or more entities determined to be interacted with by the given client device in the past—as compared to proactive cache entries that have metadata indicating alternate entities that fail to correspond to one or more entities determined to be interacted with by the given client device in the past. Also, for example, ranking metric(s) for a given proactive cache entry can indicate how often their corresponding assistant requests are submitted via an assistant interface (overall, or for the given client device) and/or how often their corresponding action content is rendered (overall, or for the given client device). Rendering of action content can include causing any associated textual/graphical/audible content, of the action content, to be rendered at the client device for performance of the action. Executing a deeplink can comprise automatically performing the associated action (e.g., opening an application to a particular state), or can comprise causing the client device to be in a state ready for performance of the associated action, where performance may be in response to a user interface input, for example. Ranking metric(s) can also be based on a recent event detection, by entity events module 150, that relates to the given proactive cache entry. For example, assume the given proactive cache includes assistant request parameters for installing a new peripheral device (e.g., a new smart thermostat) and action content that includes installation instructions. If the entity events module 150 determines a significant increase of requests (assistant requests, search engine requests, or other request(s)) related to the new peripheral device and/or a significant increase in content (e.g., webpages, social media comments) related to the new peripheral device, a corresponding ranking metric can indicate a higher ranking and make the proactive cache entry more likely to be selected.

In determining proactive cache entries for a given client device, the local module 141 can also consider storage space that has been allocated to the proactive cache for the given client device. Moreover, when determining whether to provide new proactive cache entries for the given client device when the given client device already includes existing proactive cache entries, the existing proactive cache entries can be considered. For example, ranking metric(s) for the existing proactive cache entries can be considered and/or unoccupied storage space (if any) of the existing proactive cache of the given client device can be considered.

The remote module 142 optionally generates and maintains one or more remote proactive caches 184. Each of the remote proactive caches 184 is for a subset of client devices. The subset of a remote proactive cache 184 can be a single client device, or a collection of client devices that share one or more (e.g., all) attributes in common. For example, a collection of client devices for a remote proactive cache can be those that are in the same geographic region, that have the same application(s) installed, and/or whose past interactions indicate common interest in at least a threshold quantity of the same entities. For a remote proactive cache 184 for client device(s), the remote module 142 can select one or more cache candidates 134 that were not filtered out and that were not already provided for storage in the local proactive cache. For instance, for client device 160 assume proactive cache 178 has a 500 MB limit. Further assume the local module 141 has already selected and provided, for the proactive cache 178, 500 MB worth of proactive cache entries. The remote module 142 can then select additional proactive cache entries, utilizing the same considerations as local cache module 141, for inclusion in a remote proactive cache 184 for the client device 160. For example, the remote proactive cache 184 for the client device 160 may have a 2 GB limit, and remote module 142 can select 2 GB worth of remaining proactive cache entries by comparing attribute(s) of the proactive cache entries and the client device 160, and/or considering ranking metric(s) for the proactive cache entries.

The entity events engine 150 interfaces with one or more remote systems 151 in monitoring for occurrence of events related to various entities. Some examples of determining an event for an entity are: determining an increase in requests related to the entity; determining an increase in Internet content for the entity; and/or predicting an increase in requests related to the entity. For instance, the entity events engine 150 can determine if a quantity of assistant requests (and/or traditional search requests) for a particular has spiked and/or that there is a spike in Internet content for the particular router. In response, the entity events engine 150 can provide metric(s) related to the spike to cache assembly engine 140 and cache assembly engine 140 can be more likely (than before the spike(s)) to provide proactive cache entries related to the particular router to various client devices for local proactive caching and/or for remote proactive caching. Providing the proactive cache entries for various client devices can further be based on determining those various client devices have corresponding attribute(s) that relate to the router (e.g., past searches for the particular router or for routers in general).

The entity events engine 150 can also provide an indication of the spike to the cache entry generation engine 130. In response, the cache entry generation engine 130 can optionally generate one or more proactive cache entries for the particular router. The cache entry generation engine 130 can optionally generate one or more proactive cache entries for the particular router based on determining no current cache candidates 134 relate to the particular router and/or less than a threshold quantity of the cache candidates 134 relate to the particular router. For example, the cache generation engine 130 can determine a class of the particular route (e.g., a general class of router) and determine a template for frequent queries for entities of the class. For example, a template of "what is the max bandwidth for [router alias]" (based on associated queries for other particular router aliases) or "what is the default IP address for [router alias]" (based on associated queries for other particular router aliases). The assistant request parameters for a proactive cache entry can then be generated based on replacing "router alias" with an alias for the particular router. Further, the action content for the proactive cache entry can be generated based on a snippet from a top search result for a query that replaces "router alias" with an alias for the particular router and/or using other technique(s). For example, action content of "192.168.1.1" can be generated for an assistant request of "what is the default IP address for particular router".

In some implementations, the entity events engine 150 can determine an event that indicates action content of an existing cache entry is stale, and provide an indication to the cache entry generation engine 130 to cause the cache entry generation engine 130 to generate a new cache entry to reflect updated action content and/or remove an existing cache entry with the stale content. As used herein, generating a new proactive cache entry to reflect updated action content can include updating an existing proactive cache entry to reflect the new action content (and optionally updated metadata), while maintaining the assistant request parameters of the proactive cache entry. It can also include completely removing the existing proactive cache entry and generating a new proactive cache entry with the same assistant request parameters, but the updated action content (and optionally updated metadata). As one example, the entity events engine 150 can determine that a weather forecast for a geographic region has changed by at least a threshold amount, and cause new corresponding proactive cache entries to be generated as a result.

In some implementations, remote automated assistant component(s) 180 can include a remote ASR engine 181 that performs speech recognition, a remote NLU engine 182 that performs natural language understanding, and/or a remote fulfillment engine 183 that generates fulfillment data, optionally utilizing remote proactive cache(s) 184 as described herein. A remote execution module can also optionally be included that performs remote execution based on local or remotely determined fulfillment data. Additional and/or alternative remote engines can be included. As described herein, in various implementations on-device speech processing, on-device NLU, on-device fulfillment, and/or on-device execution can be prioritized at least due to the latency and/or network usage reductions they provide when resolving a spoken and/or typed utterance (due to no client-server roundtrip(s) being needed to resolve the spoken utterance). However, one or more cloud-based automated assistant component(s) 180 can be utilized at least selectively. For example, such component(s) can be utilized in parallel with on-device component(s) and output from such component(s) utilized when local component(s) fail. For example, on-device fulfillment engine 175 can fail in certain situations (e.g., when the size constrained proactive cache 178 fails to include a matching proactive cache entry) and remote fulfillment engine 183 can utilize a more robust remote proactive cache 184 (or additional resources when remote proactive cache doesn't have a match) to generate fulfillment data in such situations. Remote fulfillment engine 184 can be operated in parallel with on-device fulfillment engine 175 and its results utilized when on-device fulfillment fails, or can be invoked responsive to determining failure of on-device fulfillment.

In various implementations, an NLU engine (on-device and/or remote) can generate annotated output that includes one or more annotations of the recognized text and one or more (e.g., all) of the terms of the natural language input. In some implementations an NLU engine is configured to identify and annotate various types of grammatical information in natural language input. For example, an NLU engine may include a morphological module that may separate individual words into morphemes and/or annotate the morphemes, e.g., with their classes. An NLU engine may also include a part of speech tagger configured to annotate terms with their grammatical roles. Also, for example, in some implementations an NLU engine may additionally and/or alternatively include a dependency parser configured to determine syntactic relationships between terms in natural language input.

In some implementations, an NLU engine may additionally and/or alternatively include an entity tagger configured to annotate entity references in one or more segments such as references to people (including, for instance, literary characters, celebrities, public figures, etc.), organizations, locations (real and imaginary), and so forth. In some implementations, an NLU engine may additionally and/or alternatively include a coreference resolver (not depicted) configured to group, or "cluster," references to the same entity based on one or more contextual cues. In some implementations, one or more components of an NLU engine may rely on annotations from one or more other components of the NLU engine.

An NLU engine may also include an intent matcher that is configured to determine an intent of a user engaged in an interaction with automated assistant 195. An intent matcher can use various techniques to determine an intent of the user. In some implementations, an intent matcher may have access to one or more local and/or remote data structures that include, for instance, a plurality of mappings between grammars and responsive intents. For example, the grammars included in the mappings can be selected and/or learned over time, and may represent common intents of users. In addition to or instead of grammars, in some implementations, an intent matcher can employ one or more trained machine learning models, alone or in combination with one or more grammars. These trained machine learning models can be trained to identify intents, e.g., by embedding recognized text from a spoken utterance into a reduced dimensionality space, and then determining which other embeddings (and therefore, intents) are most proximate, e.g., using techniques such as Euclidean distance, cosine similarity, etc. Some grammars have slots (e.g., <artist>) that can be filled with slot values. Slot values may be determined in various ways. Often users will provide the slot values proactively. For example, for a grammar "Order me a <topping> pizza," a user may likely speak the phrase "order me a sausage pizza," in which case the slot <topping> is filled automatically. Other slot value(s) can be inferred based on, for example, user location, currently rendered content, user preferences, and/or other cue(s). Use of an intent manager as described herein, which may be implemented locally, may allow proactive cache entries to be retrieved even if a user interface input to the client device is not a match (optionally an exact match) for one or more assistant request parameters of the cache entries. This may improve utility of the device.

Figure 2:
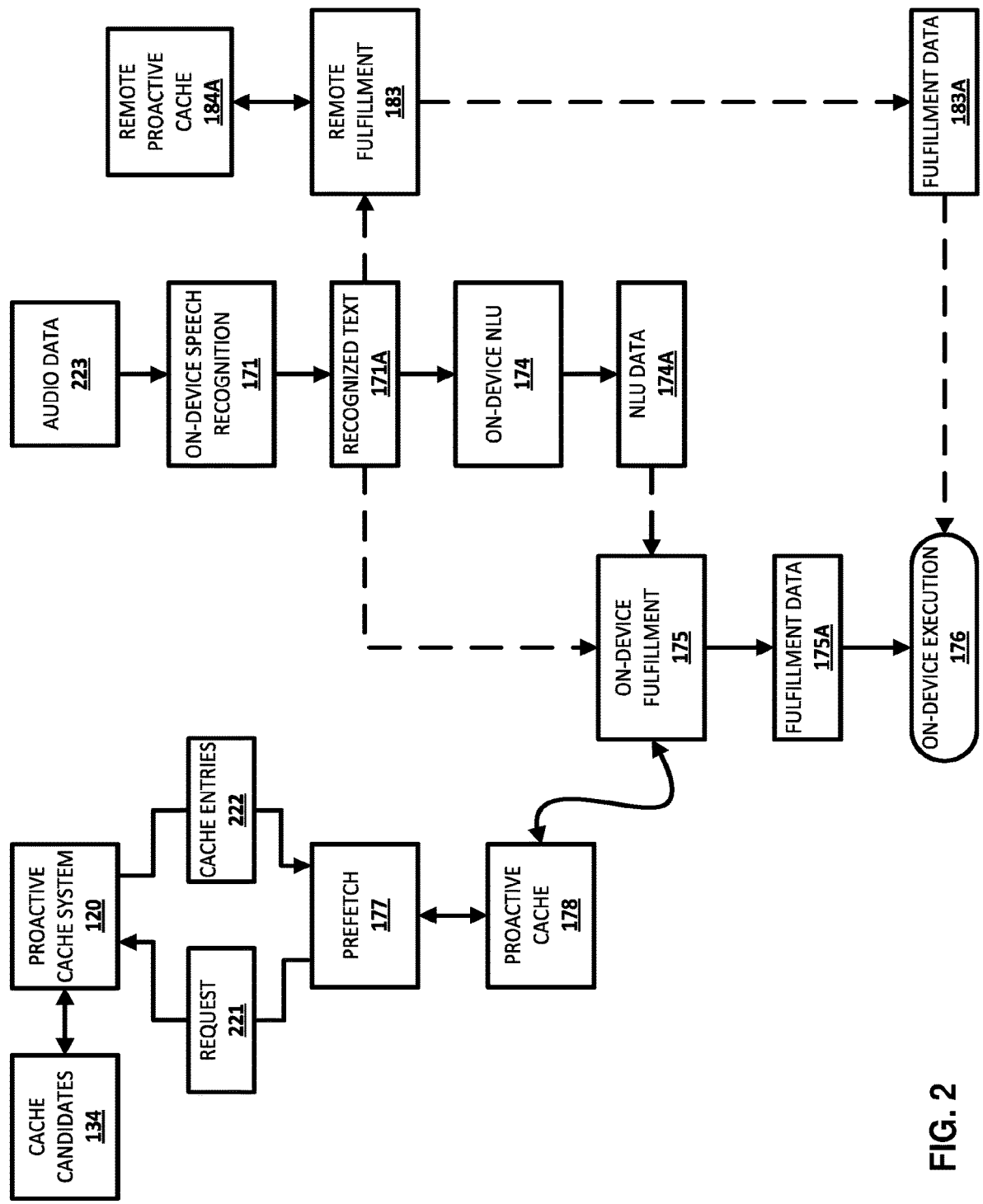
FIG. 2 depicts an example process flow that demonstrates how various components of FIG. 1 can interact in accordance with various implementations.

Turning now to FIG. 2, an example process flow is illustrated that demonstrates how various components of FIG. 1 can interact in accordance with various implementations.

In FIG. 2, the prefetch engine 177 sends a request 221 to proactive cache system 120. Proactive cache system 120 responds to the request with proactive cache entries 222. As described herein, the proactive cache entries 222 can be a subset of the cache candidates and can be selected for the client device 160 based on attribute(s) of the client device 160, attribute(s) of the cache entries 222, ranking metric(s) for the cache entries 222, and/or based on proactive cache entries already in the proactive cache 178. The prefetch engine 177 stores the cache entries 222 in the proactive cache 178, optionally removing one or more existing proactive cache entries to make room for the cache entries 222.

At a time subsequent to (e.g. minutes or hours after) storing the cache entries 222 in the proactive cache 178, audio data 223 is detected via the microphone(s) 165 (FIG. 1) of the client device 160 (FIG. 1). Detected audio data 223 is an example of user interface input to the client device. On-device speech recognition module processes the audio data 223 to generate recognized text 171A.

The recognized text 171A can optionally be provided to on-device fulfillment engine 175 and/or to remote fulfillment engine 183. When the recognized text 171A is provided to on-device fulfillment engine 175, and the on-device fulfillment engine 175 determines it matches assistant request parameters of a proactive cache entry of proactive cache 178, on-device fulfillment engine 175 can generate fulfillment data 175A that includes at least the action content of the matching proactive cache entry.

In addition to or instead of considering the recognized text 171A, on-device fulfillment engine 175 can consider NLU data 174A that is generated by on-device NLU engine 174 based on processing of the recognized text 171A (and optionally based on contextual data). When the NLU data 174A is provided to on-device fulfillment engine 175, and the on-device fulfillment engine 175 determines it matches assistant request parameters of a proactive cache entry of proactive cache 178, on-device fulfillment engine 175 can generate fulfillment data 175A that includes at least the action content of the matching proactive cache entry. The fulfillment data may also be generated if the intent of the NLU data matches said assistant request parameters.

On-device execution engine 176 can process the on-device fulfillment data 175A, including (or restricted to) the action content of a matching proactive cache entry, and perform corresponding actions. This can include: generating an audible, visual, and/or haptic response based on the action content; executing a deeplink of the action content; and/or transmitting (e.g., via Bluetooth or Wi-Fi) a command included in the action content.

In some implementations, the recognized text 171A is provided to remote fulfillment engine 183. It can be provided to remote fulfillment engine 183 in parallel with provisioning to on-device fulfillment engine 175, or optionally only responsive to on-device fulfillment engine 175 determining (based on recognized text 171A and/or NLU data 174A) that there is no matching entry in proactive cache 178. Remote fulfillment engine 183 can access a remote proactive cache 184A, assigned to the client device 160, and determine if it includes a proactive cache entry with assistant request parameters that match the recognized text 171A and/or remotely determined NLU data for the recognized text 171A. If so, it can optionally provide remote fulfillment data 183A, that includes action content from the matching remote proactive cache entry, to the on-device execution engine 176. Optionally, remote fulfillment engine 183 only provides the remote fulfillment data 183A responsive to an indication that local fulfillment (by on-device fulfillment engine 175) has failed and/or responsive to not receiving a "halt" command form client device 160 (which can be provided when local fulfillment is successful). Remote fulfillment engine 183 can also optionally utilize other techniques to generate fulfillment data 183A (e.g., action content) "on the fly". This can be done in parallel with accessing remote proactive cache 184A to determine whether there is a machine remote proactive cache entry and/or performed responsive to determining there is no matching remote proactive cache entry. Since action content in remote proactive cache 184A is already pre-generated, remote fulfillment data can be obtained by remote fulfillment engine 183 more quickly and with utilization of less resources than if it were to be generated on the fly. Accordingly, various implementations can provide remote fulfillment data based on only the remote proactive cache 184A if a matching remote proactive cache entry is identified, optionally without attempting to generate the fulfillment data on the fly and/or halting the on the fly generation if a match is determined.

FIG. 3 illustrates some non-limiting examples of proactive cache entries 310, 320, and 330. Such proactive cache entries could be stored, along with a large quantity of additional entries, in local proactive cache 178 (FIG. 1) or in one of the remote proactive cache(s) 184 (FIG. 1).

Proactive cache entry 310 includes request parameters 310A that represent various assistant requests for performing a given action of obtaining tomorrow's local weather forecast. The request parameters 310A include textual representations of "Tomorrow's weather", "Weather tomorrow", as well as a structured NLU data representation that specifies an intent of "weather" as well as slot values of "tomorrow" for a "day" slot and "local" for a "location" slot. The action content 310B of proactive cache entry 310 includes text that describes tomorrow's local weather as well as a graphic that conveys tomorrow's local weather. Both the text and the graphic can be rendered in response to determining that user input (e.g., a spoken utterance or typed utterance) matches the request parameters 310A. Optionally, synthesized speech, based on the text, can also be rendered in response. Metadata 310C of proactive cache entry 310 includes a TTL of 12 hours, and a timestamp. As described herein, the proactive cache entry 310 can be removed from the proactive cache (or at least no longer utilized) once the TTL is determined to have expired. As also described herein, the proactive cache entry 310 can be provided for a given client device in a given geographic area, while other proactive cache entries, with the same request parameters but different action content, can be provided for other client device in other geographic areas.

Proactive cache entry 320 includes request parameters 320A that represent various assistant requests for performing a given action of accessing a thermostat schedule adjustment state of a corresponding application. The request parameters 320A include textual representations of "Adjust thermostat schedule", "Change schedule for thermostat", as well as a structured NLU data representation that specifies an intent of "thermostat" as well as a slot value of "change/adjust schedule" for a "setting" slot. The action content 320B of proactive cache entry 320 includes a deeplink to a particular application. The deeplink can be executed in response to determining that user input (e.g., a spoken utterance or typed utterance) matches the request parameters 320A. Executing the deeplink causes the particular application to be opened in a state where thermostat schedule settings can be adjusted (i.e., the application is in state where the next user input can cause performance of the action). Metadata 320C of proactive cache entry 320 includes a TTL of 30 days, and a timestamp. As described herein, the proactive cache entry 320 can be removed from the proactive cache (or at least no longer utilized) once the TTL is determined to have expired. As also described herein, the proactive cache entry 320 can be provided for a given client device based on determining that client device has the particular application (corresponding to the deeplink of action content 320B) installed and/or indicated as a primary thermostat application, while other proactive cache entries, with the same request parameters but different action content (e.g., different deeplinks), can be provided for other client devices that don't have the particular application installed.

Proactive cache entry 330 includes request parameters 330A that represent various assistant requests for performing a given action of obtaining an estimated net worth for "John Doe" (a hypothetical person). The request parameters 330A include textual representations of "John Doe's net worth" and "How much is John Doe worth". The action content 330B of proactive cache entry 330 includes text that describes John Does' net worth. The text can be rendered in response to determining that user input (e.g., a spoken utterance or typed utterance) matches the request parameters 330A. Optionally, synthesized speech, based on the text, can also be rendered in response. Metadata 330C of proactive cache entry 330 includes a TTL of 7 days, and a timestamp. As described herein, the proactive cache entry 330 can be removed from the proactive cache (or at least no longer utilized) once the TTL is determined to have expired. As also described herein, the proactive cache entry 330 can be provided for a given client device based on determining that attribute(s) of the given client device are related to John Doe. This can be based on, for example, the user searching for John Doe in the past, visiting Internet content associated with John Doe, and/or searching for other entities with a strong relationship to John Doe (e.g., as determined based on a knowledge graph or other data structure). In various implementations, the proactive cache entry 330 can be generated and/or provided based at least in part on determining an event related to John Doe, such as an increase in requests and/or Internet content related to John Doe. For example, the proactive cache entry related to John Doe's net worth can be generated based on determining John Doe is a celebrity (class) and frequent queries for celebrities have a template of "what is [celebrity alias] net worth". Also, for example, the proactive cache entry can be provided for storage in local or remote proactive cache entry based on ranking metric(s) that are influenced by the increase in requests and/or Internet content related to John Doe.

Figure 4:
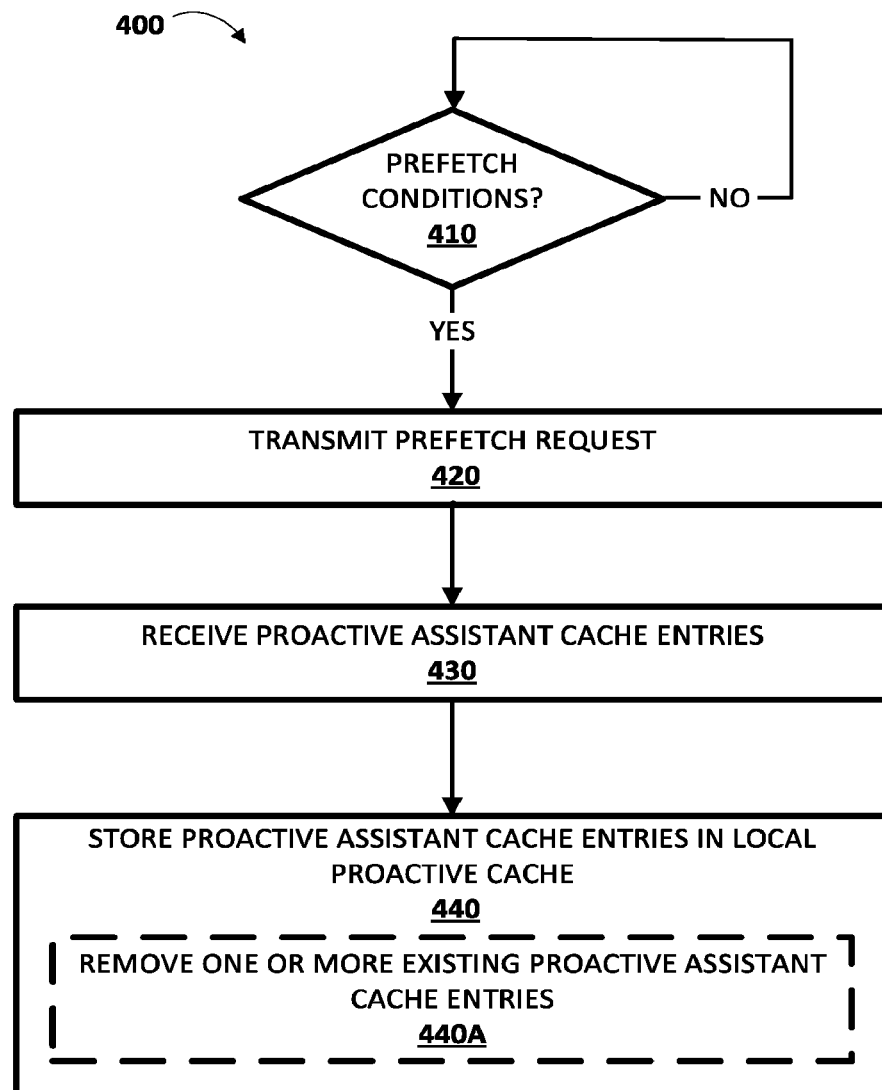
FIG. 4 depicts a flowchart illustrating an example method of prefetching and storing proactive cache entries according to implementations disclosed herein.

FIG. 4 depicts a flowchart illustrating an example method 400 of prefetching and storing proactive cache entries according to implementations disclosed herein. For convenience, the operations of the method 400 are described with reference to a system that performs the operations. This system may include various components of various computer systems, such as one or more components of a client device (e.g., the prefetch engine 177 of FIG. 1). Moreover, while operations of the method 400 are shown in a particular order, this is not meant to be limiting. One or more operations may be reordered, omitted or added.

At block 410, the system determines whether one or more prefetch conditions have occurred. If not, the system continues to determine whether the prefetch condition(s) have occurred. If so, the system proceeds to block 420. The prefetch condition(s) can include, for example, one or more of: that certain network condition(s) are present for a client device; that the client device is charging and/or has at least a threshold battery state of charge; that the client device is not being actively utilized by a user; that current processor usage and/or current memory usage of the client device do not exceed certain thresholds; and/or that a certain amount of time (e.g., at least one hour) has elapsed since a most recent prefetch request.

At block 420, the system transmits a prefetch request. The prefetch request can optionally include an identifier of the client device and/or token(s) or other indications indicating proactive cache entries that are already locally stored at the client device.

At block 430, the system receives proactive assistant cache entries responsive to the request of block 420.

At block 440, the system stores the received proactive assistant cache entries in a local proactive cache. Block 440 can optionally include block 440A, where the system removes, from the local proactive cache, one or more existing proactive cache entries to make room for the received proactive cache entries. After block 440, the system can again proceed to block 410, optionally after a threshold amount of time has elapsed.

Figure 5A:
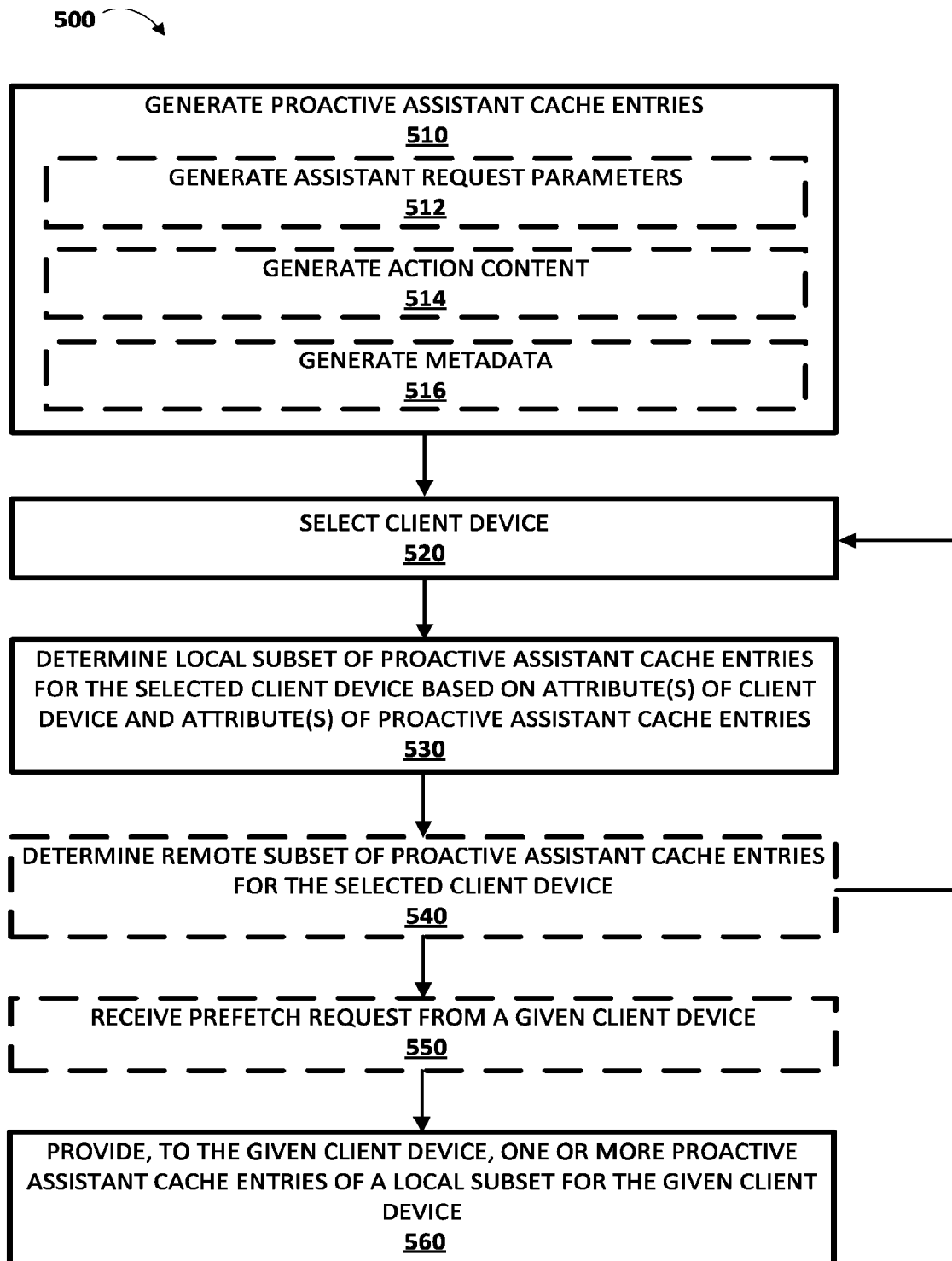
FIG. 5A depicts a flowchart illustrating an example method of generating proactive cache entries, and provisioning of a local subset of the proactive cache entries to a given client device and/or determining a remote subset of the proactive cache entries.
Figure 5B:
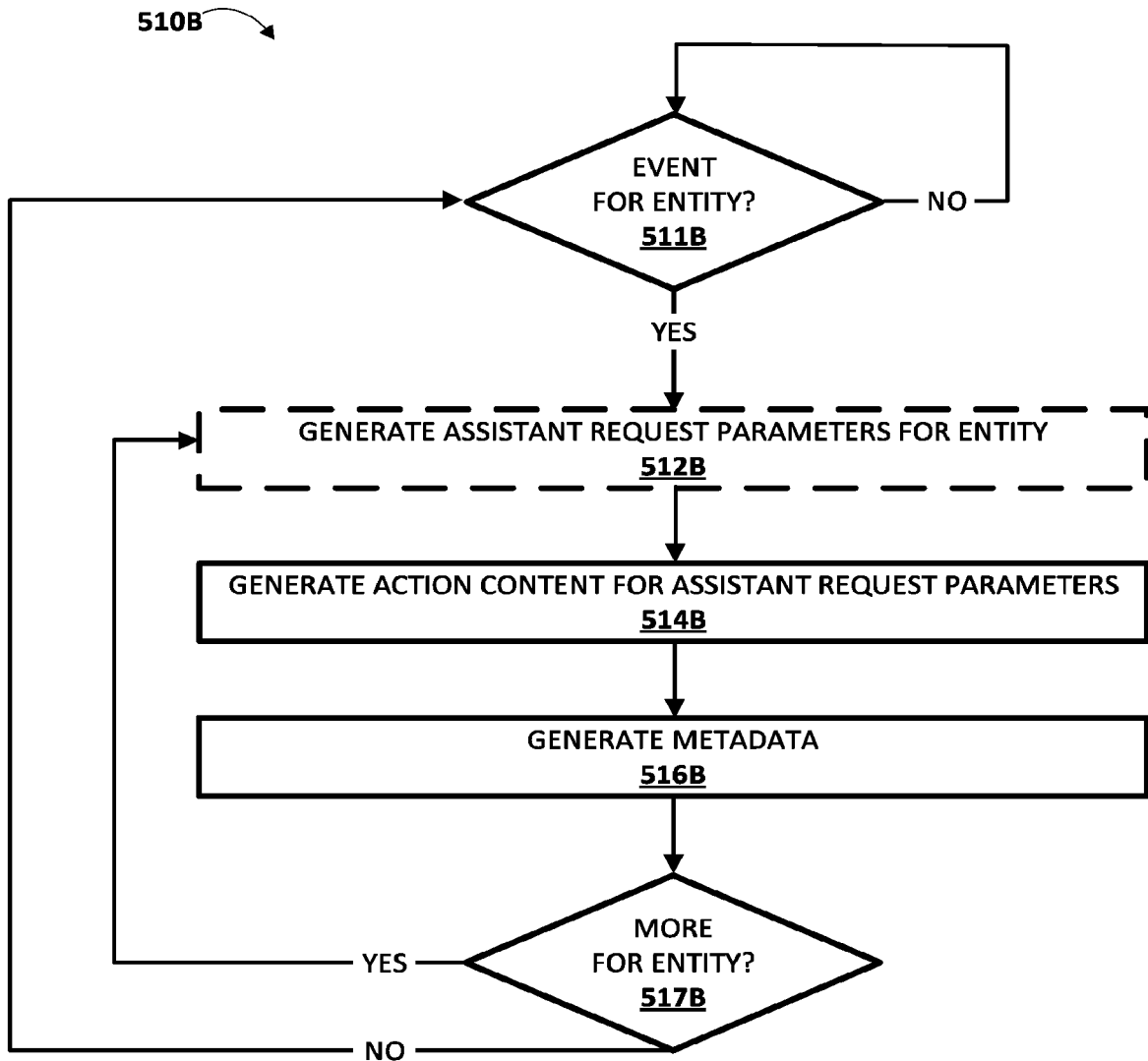
FIG. 5B depicts a flowchart illustrating some implementations of block 510 of FIG. 5A.
Figure 5C:
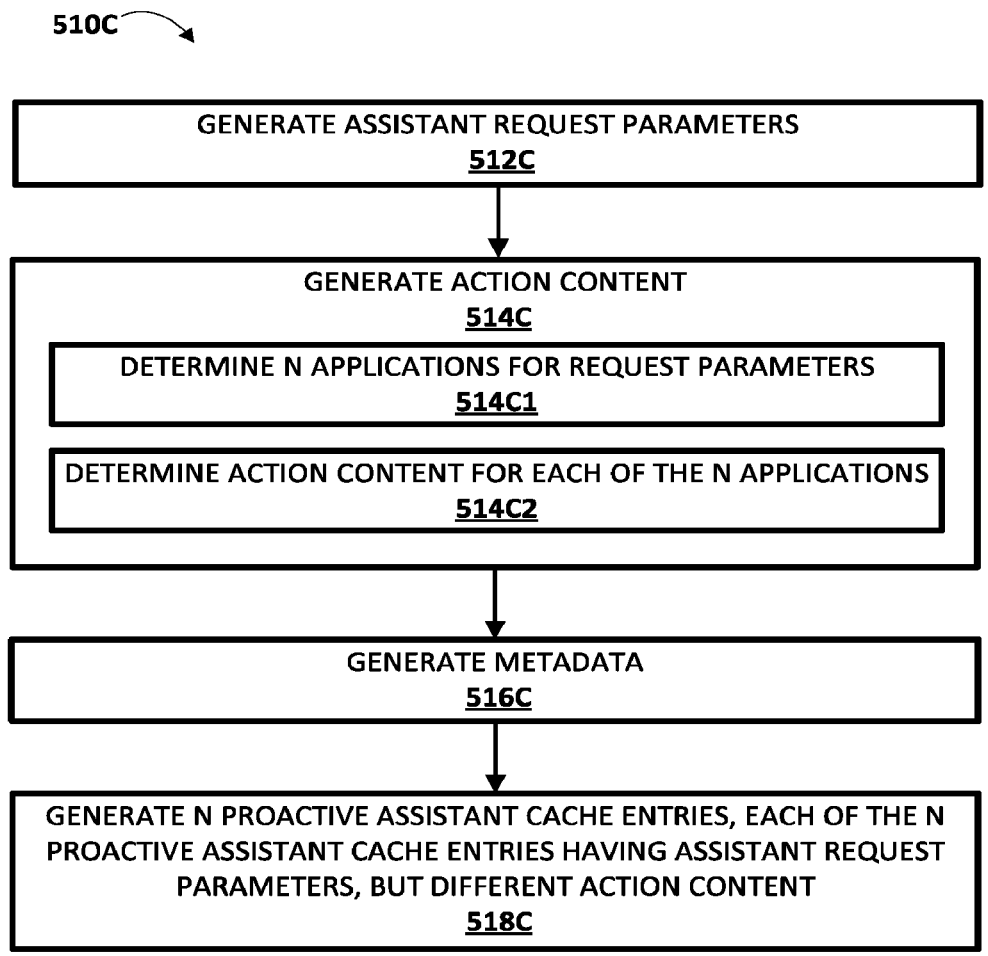
FIG. 5C depicts a flowchart illustrating some additional or alternative implementations of block 510 of FIG. 5A.

FIG. 5A depicts a flowchart illustrating an example method 500 of generating proactive cache entries, and provisioning of a local subset of the proactive cache entries to a given client device and/or determining a remote subset of the proactive cache entries. FIG. 5B depicts a flowchart illustrating some implementations of block 510 of FIG. 5A. FIG. 5C depicts a flowchart illustrating some additional or alternative implementations of block 510 of FIG. 5A. For convenience, the operations of the method 500 are described with reference to a system that performs the operations. This system may include various components of various computer systems, such as one or more components of remote server(s) (e.g., the proactive cache system of FIG. 1). Moreover, while operations of the method 500 are shown in a particular order, this is not meant to be limiting. One or more operations may be reordered, omitted or added.

Starting initially with FIG. 5A, at block 510, the system generates proactive assistant cache entries. In generating each proactive assistant cache entry, block 510 can include sub-blocks 512, 514, and/or 516. At block 512, the system generates assistant request parameters for the proactive assistant cache entry. At block 514, the system generates action content for the proactive assistant cache entry. At block 516, the system generates metadata for the proactive assistant cache entry. Additional description of implementations of block 510 is provided below with respect to FIGS. 5B and 5C, as well as elsewhere herein.

At block 520, the system selects a client device.

At block 530, the system determines a local subset of proactive assistant cache entries for the selected client device. The system determines the local subset based on attribute(s) of the client device and attribute(s) of the proactive assistant cache entries. For example, some of the proactive assistant cache entries can be selected based on having attribute(s) that correspond to attribute(s) of the client device. Such attribute(s) can include application(s) (e.g., installed on the client device and corresponding to deeplink(s) of the proactive assistant cache entries), geographic location (e.g., of the client device and corresponding to the proactive assistant cache entries), entities interacted with via the client device (e.g., through searching or visiting content) as compared to entities corresponding to the proactive assistant cache entries, and/or other attribute(s). Also, for example, some of the proactive cache entries can additionally or alternatively be selected based on ranking metric (s) for the proactive cache entries. A quantity of proactive assistant cache entries included in the local subset can be influenced by a size of the proactive assistant cache of the client device.

At block 540, the system optionally determines a remote subset of proactive cache entries for the selected client device. The remote subset can include (or be restricted to) proactive cache entries not included in the local subset of block 530. In some implementations, block 540 can consider attribute(s) of the client device and attribute(s) of the proactive assistant cache entries in determining the remote subset of block 540. A quantity of proactive assistant cache entries included in the remote subset can also be influenced by a size of the remote proactive cache. The remote proactive assistant cache can be specific to the client device, or to a restricted group of client devices that include the client device and other similar client device(s). The remote proactive assistant cache can be utilized by remote automated assistant component(s), as described herein, in reducing latency in provisioning of responses to requests originating from the client device.

The system can then proceed back to block 520, select another client device, and perform blocks 530 and 540 for the other client device. It is understood that multiple iterations of blocks 520, 530, and 540 can be performed in parallel, each for a different client device. It is further understood that blocks 520, 530, and 540 can be repeated for various client devices at regular or non-regular intervals to maintain up to date local and/or remote proactive assistant caches, and to account for newly generated proactive assistant cache entries that may be generated through multiple iterations of block 510.

At block 550, the system optionally receives a prefetch request form a given client device. For example, the given client device can transmit the prefetch request as described with respect to method 400.

At block 560, the system provides, to the given client device, one or more proactive assistant cache entries of a local subset, determined for the given client device at an iteration of block 530. Which entries of the local subset are provided can be based on determining which (if any) are already stored in the local proactive cache of the given client device. For example, optionally only those that aren't already present in the local proactive cache can be provided at block 560. The provided proactive assistant cache entries can be stored, by an automated assistant application of the given client device, in a local proactive cache for utilization by the automated assistant application in locally fulfilling future user interface input provided at the given client device.

When block 550 is performed, block 560 can be performed responsive to the prefetch request. When block 550 is not performed, block 560 can include proactively pushing the proactive assistant cache entries independent of an explicit request from the given client device. It is understood that block 560 (and optionally block 550) will be performed for each of a large quantity of client devices, and will be performed on multiple occasions for each of the client devices. It is further understood that, through the method 500, disparate proactive cache entries will be provided to different client devices (and/or for storage in corresponding remote proactive caches), and will be updated over time.

Turning to FIG. 5B, a flowchart 510B is provided that illustrates some implementations of block 510 of FIG. 5A. At block 511B the system determines if there has been an event for an entity. If not, the system continues to monitor for an event at block 511B. If so, the system generates a proactive cache entry based on the event by optionally proceeding to block 512B and generating assistant request parameters for the entity, to block 514B and generating action content for the assistant request parameters, and to block 516B and generating metadata for the proactive cache entry. The proactive cache entry will include the assistant request parameters, the action content, and the metadata. At block 517B, the system determines whether to generate more proactive assistant cache entries for the entity. If so, the system generates another proactive assistant cache entry for the entity by optionally performing another iteration of block 512B, and performing another iteration of block 514B and block 516B. If not, the system proceeds back to block 511B and monitors for another event for the entity and/or for another entity.

As one example, at block 511B the event can be a change to a weather forecast for a geographic area. Continuing with the example, a proactive cache entry can be generated that reflects new action content (describing the new weather forecast) at block 514B and new metadata (e.g., timestamp) at block 516B, but keeps the same assistant request parameters as a prior entry for the weather forecast for the geographic area.

As another example, at block 511B the event can be an increase in music streaming requests related to a particular musical artist. Continuing with the example, a proactive cache entry can be generated that includes: assistant request parameters, generated at 512B, related to assistant request(s) for streaming music from the particular musical artist; action content, generated at block 514B, that includes a deeplink to stream the particular artist for a first application; and metadata (e.g., TTL value) generated at block 516B. Further, at block 517B it can be determined to generate another proactive cache entry that includes the same assistant request parameters and/or metadata, but a different deeplink in the action content. The different deeplink is generated at another iteration of block 514B and includes a deeplink to stream the particular musical artist for a second application.

As yet another example, at block 511B the event can be an increase in requests and/or content related to a particular city. Continuing with the example, a proactive cache entry can be generated that includes: assistant request parameters, generated at 512B, based on frequent assistant requests for other cities (e.g., that request the population of the particular city); action content, generated at block 514B, that includes a visual and/or textual response (e.g., a visual and/or textual representation of the population); and metadata (e.g., TTL value) generated at block 516B. Further, at block 517B it can be determined to generate an additional proactive cache entry that is based on other frequent assistant request for other cities. For instance, an additional proactive cache entry can be generated that includes: assistant request parameters, generated at 512B, based on other frequent assistant requests for other cities (e.g., that requests climate information for the particular city); action content, generated at block 514B, that includes a visual and/or textual response (e.g., a visual and/or textual representation of the climate information); and metadata (e.g., TTL value) generated at block 516B.

Turning to FIG. 5C, a flowchart 510C is provided that illustrates some additional or alternative implementations of block 510 of FIG. 5A. For example, some iterations of block 510 can be performed based on flowchart 510B while others can be performed based on flowchart 510C. At block 512C, the system generates assistant request parameters. As a working example, assistant request parameters can be generated for streaming Bluegrass music, such as parameters of "play some Bluegrass", "jam out to some Bluegrass", and/or "{Intent=stream music; genre=bluegrass}".

At block 514C, the system generates action content by determining, at sub-block 514C1, N applications for the request parameters, where N is an integer greater than 1. For example, the system can determine 15 applications for streaming bluegrass music. Further, at sub-block 514C2 the system determines action content for each of the N applications. For example, the system determines, as action content for each of the N applications, a corresponding deeplink that, when executed, causes a corresponding application to stream bluegrass music.

At block 516C the system generates metadata.

At block 518C, the system generates N proactive assistant cache entries. Each of the N generated proactive assistant cache entries have the same assistant request parameters of 512C and optionally the same metadata of 516C, but include different action content (i.e., each can include action content with only a corresponding deeplink for a single one of the N applications).

Figure 6:
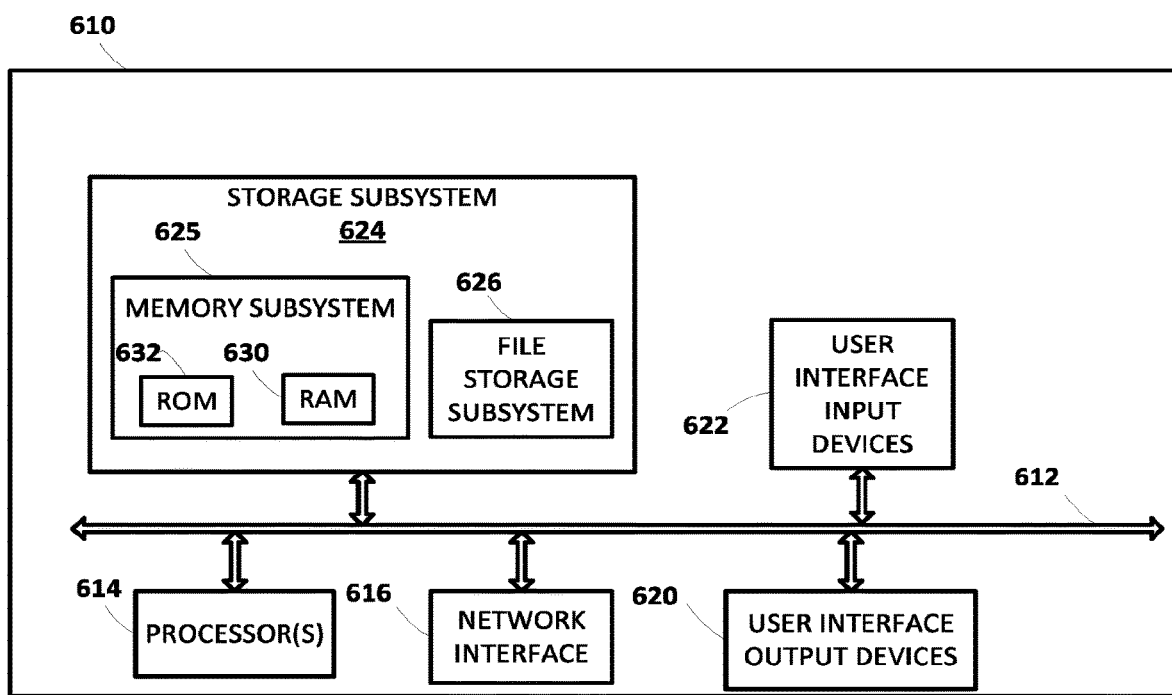
FIG. 6 illustrates an example architecture of a computing device.

FIG. 6 is a block diagram of an example computing device 610 that may optionally be utilized to perform one or more aspects of techniques described herein. In some implementations, one or more of a client device, cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods described herein, as well as to implement various components depicted herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method performed by one or more processors is provided and includes determining assistant request parameters that represent one or more assistant requests for performing a given action. The assistant request parameters define one or more textual representations of the assistant requests and/or one or more semantic representations of the assistant requests. The method further includes determining that the given action can be performed using a first application and can also be performed using a second application. The method further includes generating first action content for the first application and generating second action content for the second application. The first action content includes a first deeplink for the first application. The first deeplink is locally executable by assistant client applications of client devices having the first application installed, and local execution of the first deeplink causes the first application to open in a first state for performing the given action. The second action content includes a second deeplink for the second application. The second deeplink differs from the first deeplink, is locally executable by assistant client applications of client devices having the second application installed, and local execution of the second deeplink causes the second application to open in a second state for performing the given action. The method further includes generating a first proactive assistant cache entry that includes the assistant request parameters and the first action content, and generating a second proactive assistant cache entry that includes the assistant request parameters and the second action content. The method further includes generating proactive cache entries for a given client device. Generating the proactive cache entries includes including the first proactive cache entry, but not the second proactive cache entry, based on the given client device having the first application installed but not having the second application installed. The method further includes transmitting the proactive cache entries to the given client device, optionally responsive to receiving a proactive cache request transmitted by the given client device. An automated assistant application of the given client device stores the proactive cache entries in a local proactive cache for utilization by the automated assistant application in locally fulfilling future user interface input provided at the given client device.

These and other implementations of the technology disclosed herein can include one or more of the following features.

In some implementations, the method further includes determining an increase in requests for the given action and, responsive to determining the increase in requests for the given action, generating the first proactive cache entry and generating the second proactive cache entry.

In some implementations, the method further includes determining an increase in requests for the given action, and including the first proactive cache entry in the proactive cache entries is further based on the increase in requests for the given action. In some of those implementations, including the first proactive cache entry in the proactive cache entries further based on the increase in requests for the given action includes: determining that an entity, to which the given action is directed, corresponds to one or more attributes for the given client device for which the proactive cache entries are generated. In some versions of those implementations, the first application is a music streaming application, the given action is streaming music of the entity, and the attributes for the given client device include an association of the given client device to the entity. The requests can include, for example, automated assistant requests and/or additional requests. The automated assistant requests are to corresponding automated assistant applications and are each generated responsive to corresponding user interface input. The additional requests are in addition to automated assistant requests and originate from one or more additional applications that are in addition to automated assistant applications.

In some implementations, the method further includes predicting an increase in requests for the given action and, responsive to determining the increase in requests for the given action, generating the first proactive cache entry and generating the second proactive cache entry. In some additional or alternative implementations, the method further includes predicting an increase in requests for the given action and including the first proactive cache entry in the proactive cache entries is further based on the determined increase in requests for the given action. Predicting the increase in the requests for the given action can include determining an increase in Internet content related to an entity to which the given action is directed and/or determining a future event associated with the entity to which the given action is directed.

In some implementations, the method further includes generating a time to live value for the first proactive assistant cache entry and including the time to live value in the first proactive assistant cache entry. The time to live value causes the given client device to remove the first proactive assistant cache entry from the local proactive cache in response to expiration of a time duration defined by the time to live value. In some of those implementations, the method further includes, by the assistant client application of the given client device: removing the first proactive assistant cache entry from the proactive cache entry based on comparing the time to live value to a timestamp for the first proactive assistant cache entry.

In some implementations, the method further includes, by the assistant client application of the given client device: receiving the proactive cache entries responsive to transmitting the proactive cache request; and storing the proactive cache entries in the local proactive cache of the given client device. In some of those implementations, the method further includes, by the assistant client application of the given client device and subsequent to storing the proactive cache entries in the local proactive cache: generating, using on-device speech recognition, recognized text based on a spoken utterance captured in audio data detected by one or more microphones of the client device as user interface input; determining, based on the accessing the proactive cache, that the assistant request parameters, of the first proactive assistant cache entry, match the recognized text and/or natural language understanding data generated based on the recognized text; and, in response to determining the match, locally executing the first deeplink to cause the first application to open in the first state for performing the given action.

In some implementations, the method further includes, by the assistant client application of the given client device: determining that a network status of the given client device and/or a computational load status of the given client device satisfies one or more conditions; transmitting the proactive cache request responsive to determining that the network status and/or the computational load status satisfy the one or more conditions; receiving the proactive cache entries responsive to transmitting the proactive cache request; and storing the proactive cache entries in the local proactive cache of the given client device.

In some implementations, a method performed by one or more processors is provided and includes determining occurrence of an event associated with a particular entity. The method further includes, in response to determining occurrence of the event associated with the particular entity, generating one or more proactive assistant cache entries for the particular entity. Each of the proactive assistant cache entries define: respective assistant request parameters and respective assistant action content. The respective assistant request parameters each represent one or more respective assistant requests related to the particular entity, and define one or more textual representations of the assistant requests and/or one or more semantic representations of the assistant requests. The respective assistant action content are each locally interpretable by assistant client applications of client devices to cause local performance, by the assistant client application, of an assistant action that is related to the particular entity and responsive to the one or more respective assistant requests. The method further includes selecting a subset of client devices based on determining that the client devices of the subset each have one or more corresponding attributes that correspond to the particular entity. The method further includes transmitting the proactive assistant cache entries for the particular entity to a plurality of the client devices of the subset, without transmitting the proactive assistant cache entries to other client devices not in the selected subset. Transmitting the proactive assistant cache entries causes a corresponding automated assistant application of each of the client devices to locally cache the proactive assistant cache entries in a local proactive cache for utilization by the automated assistant application in locally fulfilling future spoken utterances provided at the given client device.

These and other implementations of the technology disclosed herein can include one or more of the following features.

In some implementations, determining occurrence of an event associated with a particular entity includes determining an increase in requests related to the particular entity and/or an increase in Internet content for the particular entity.

In some implementations, generating a given one of the one or more proactive assistant cache entries for the particular entity includes: generating the one or more respective assistant requests related to the particular entity based on one or more attributes of the particular entity; and generating the respective assistant request parameters based on the one or more respective assistant requests.

In some implementations, the particular entity is a particular person or a particular organization.

In some implementations, generating the one or more respective assistant requests based on one or more attributes of the particular entity includes: determining a class of the entity; determining a template for most frequent queries for entities of the class; and generating at least one of the respective assistant requests using the template and an alias of the entity.

In some implementations, the event associated with the particular entity is an attribute that is changed for the particular entity or new for the particular entity. In some of those implementations, generating the one or more proactive assistant cache entries for the particular entity includes: generating a given one of the proactive assistant cache entries by altering the respective action content, for a previously generated proactive assistant cache entry, to cause the attribute to be rendered during local performance of the action for the given one. In some versions of those implementations, the particular entity is weather in a geographic area and the attribute is a high temperature in the geographic area, a low temperature in the geographic area, and/or a rain chance in the geographic area. In some other versions of those implementations, the particular entity is an event and the attribute is a start time of the event, an end time of the event, and/or a location of the event.

In some implementations, the method further includes selecting a second subset, of the client devices, that are non-overlapping with the client devices of the subset. The method further includes storing the proactive assistant cache entries in one or more remote proactive caches that are utilized in response to assistant requests from the client devices of the second subset. In some of those implementations, the one or more remote proactive caches include a corresponding one of the remote proactive caches for each of the client devices of the second subset.

In some implementations, the method further includes, by the assistant client application of a given client device, of the client devices of the subset: transmitting a proactive cache request, and transmitting the proactive assistant cache entries to the given client device is responsive to receiving the proactive cache request.

In some implementations, the method further includes by the assistant client application of a given client device, of the client devices of the subset: receiving the proactive cache entries; and storing the proactive cache entries in a given local proactive cache of the given client device. In some of those implementations, the method further includes, subsequent to storing the proactive cache entries in the local proactive cache, and by the assistant client application of the given client device: generating, using on-device speech recognition, recognized text based on a spoken utterance captured in audio data detected by one or more microphones of the client device; determining, based on the accessing the proactive cache, that the respective assistant request parameters, of a given one of the proactive assistant cache entries, match the recognized text and/or natural language understanding data generated based on the recognized text; and, in response to determining the match, locally interpreting the respective assistant action content of the given one of the proactive assistant cache entries. In some versions of those implementations, locally interpreting the respective assistant action content of the given one of the proactive assistant cache entries includes causing textual and/or graphical content, of the assistant action content, to be rendered at the client device.

In some implementations, a method implemented by one or more processors is provided and includes determining occurrence of an event associated with a particular entity. The method further includes, based on determining occurrence of the event associated with the particular entity, selecting a subset of client devices based on determining that the client devices of the subset each have one or more corresponding attributes that correspond to the particular entity. The method further includes transmitting one or more proactive assistant cache entries for the particular entity to a plurality of the client devices of the subset, without transmitting the proactive assistant cache entries to other client devices not in the selected subset. The proactive assistant cache entries for the particular entity each define: respective assistant request parameters that represent one or more respective assistant requests related to the particular entity; and respective assistant action content that is locally interpretable by assistant client applications of client devices to cause local performance, by the assistant client application, of an assistant action that is related to the particular entity and responsive to the one or more respective assistant requests. Transmitting the proactive assistant cache entries causes a corresponding automated assistant application of each of the client devices to locally cache the proactive assistant cache entries in a local proactive cache for utilization by the automated assistant application in locally fulfilling future spoken utterances provided at the given client device.

These and other implementations of the technology disclosed herein can include one or more of the following features.

In some implementations, determining occurrence of the event associated with the particular entity includes: determining an increase in Internet content for the particular entity; determining an increase in requests for the particular entity, including requests that are from one or more non-automated assistant applications; and/or determining, through interaction with one or more remote servers, a change in an attribute of the particular entity.

What is claimed is:

1. A method performed by one or more processors, the method comprising:
   determining occurrence of an event associated with a particular entity, wherein the event relates to a music streaming request;
   determining that a particular client device is related to the event associated with the particular entity;
   in response to determining occurrence of the event associated with the particular entity, and determining that the particular client device is related to the event associated with the particular entity:
      transmitting, to the particular client device, a proactive assistant cache entry for the particular entity, the proactive assistant cache entry defining:
         respective assistant action content that includes text and that is locally interpretable by an assistant client application of the particular client device to cause local performance, by the assistant client application, of an assistant action that is related to the particular entity and responsive to an assistant request,
         wherein the assistant action comprises rendering audio data that is generated by an on-device speech synthesizer using the text of the assistant action content;
      wherein transmitting the proactive assistant cache entry causes the assistant application of the particular client device to locally cache the proactive assistant cache entry for utilization in performing the assistant action in response to a future spoken utterance that is provided at the given client device and determined to correspond to the assistant request.

2. The method of claim 1, further comprising:
   receiving, at the particular client device, the proactive assistant cache entry.

3. The method of claim 2, further comprising:
   processing, at the particular client device, an utterance detected via one or more microphones of the client device;
   determining, at the particular client device, that the proactive assistant cache entry is responsive to utterance; and
   in response to determining that the proactive assistant cache entry is responsive to the utterance:
      using, at the particular client device, the proactive assistant cache entry to generate the audio data using the on-device speech synthesizer.

4. The method of claim 1, further comprising:
   selecting the proactive assistant cache entry, from among multiple proactive assistant cache entries for the particular entity, wherein selecting the proactive assistant cache entry is based on an attribute of the particular client device and is based on determining that the particular client device is related to the event associated with the particular entity;
   wherein transmitting, to the particular client device, the proactive assistant cache entry is responsive to selecting the proactive assistant cache entry.

5. The method of claim 4, wherein the attribute is a particular music streaming application that is indicated as preferred for the particular client device.

6. The method of claim 1, wherein the particular entity is a particular musical artist.

7. The method of claim 6, wherein the event is an increase in music streaming requests related to the particular musical artist.

8. The method of claim 1, wherein the proactive assistant cache entry further defines a time to live value, wherein transmitting the proactive assistant cache entry causes the assistant application of the particular client device to locally cache the proactive assistant cache entry for a duration that is based on the time to live value.

9. A system comprising:
   one or more server processors operable to execute instructions to:
      determine occurrence of an event associated with a particular entity, wherein the event relates to a music streaming request;
      determine that a particular client device is related to the event associated with the particular entity;
      in response to determining occurrence of the event associated with the particular entity, and determining that the particular client device is related to the event associated with the particular entity:
         transmit, to the particular client device, a proactive assistant cache entry for the particular entity, the proactive assistant cache entry defining:

respective assistant action content that includes text and that is locally interpretable by an assistant client application of the particular client device to cause local performance, by the assistant client application, of an assistant action that is related to the particular entity and responsive to an assistant request,
wherein the assistant action comprises rendering audio data that is generated by an on-device speech synthesizer using the text of the assistant action content;
wherein transmitting the proactive assistant cache entry causes the assistant application of the particular client device to locally cache the proactive assistant cache entry for utilization in performing the assistant action in response to a future spoken utterance that is provided at the given client device and determined to correspond to the assistant request.

10. The system of claim 9, further comprising:
one or more client device processors, of the particular client device, operable to execute client instructions to:
receive the proactive assistant cache entry.

11. The system of claim 10, wherein one or more of the client device processors are further operable to execute the client instructions to:
process an utterance detected via one or more microphones of the client device;
determine that the proactive assistant cache entry is responsive to utterance; and
in response to determining that the proactive assistant cache entry is responsive to the utterance:
use the proactive assistant cache entry to generate the audio data using the on-device speech synthesizer.

12. The system of claim 9, wherein one or more of the server processors are further operable to execute the instructions to:
select the proactive assistant cache entry, from among multiple proactive assistant cache entries for the particular entity, wherein in selecting the proactive assistant cache entry one or more of the server processors are to select the proactive assistant cache entry based on an attribute of the particular client device and based on determining that the particular client device is related to the event associated with the particular entity;
wherein in transmitting, to the particular client device, the proactive assistant cache entry, one or more of the server processors are to transmit the proactive assistant cache entry responsive to selecting the proactive assistant cache entry.

13. The system of claim 9, wherein the attribute is a particular music streaming application that is indicated as preferred for the particular client device.

14. The system of claim 13, wherein the particular entity is a particular musical artist.

15. The system of claim 14, wherein the event is an increase in music streaming requests related to the particular musical artist.

16. The system of claim 9, wherein the proactive assistant cache entry further defines a time to live value, wherein transmitting the proactive assistant cache entry causes the assistant application of the particular client device to locally cache the proactive assistant cache entry for a duration that is based on the time to live value.

* * * * *